US008089936B2

(12) United States Patent
Watanabe

(10) Patent No.: US 8,089,936 B2
(45) Date of Patent: Jan. 3, 2012

(54) COMMUNICATIONS SYSTEM, COMMUNICATIONS PROCESSING METHOD, AND NODES

(75) Inventor: Teruyoshi Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 76 days.

(21) Appl. No.: 12/273,232

(22) Filed: Nov. 18, 2008

(65) Prior Publication Data

US 2009/0207855 A1 Aug. 20, 2009

(30) Foreign Application Priority Data

Feb. 20, 2008 (JP) ................................. 2008-038595

(51) Int. Cl.
*H04W 4/00* (2009.01)
*H04J 3/16* (2006.01)
*H04J 3/22* (2006.01)

(52) U.S. Cl. ....................................... 370/331; 370/465
(58) Field of Classification Search .................. None
See application file for complete search history.

(56) References Cited

U.S. PATENT DOCUMENTS

| 6,389,555 | B2 * | 5/2002 | Purcell et al. .................... 714/10 |
| 6,891,795 | B1 * | 5/2005 | Hamachi et al. ................ 370/227 |
| 2002/0093981 | A1 * | 7/2002 | Turina et al. ................... 370/467 |
| 2005/0117529 | A1 * | 6/2005 | Ramos-Escano et al. .... 370/282 |
| 2007/0025734 | A1 | 2/2007 | Oogushi et al. |
| 2007/0249344 | A1 * | 10/2007 | Hosono et al. ............. 455/435.1 |
| 2007/0266174 | A1 * | 11/2007 | Bestler .......................... 709/238 |
| 2009/0207808 | A1 * | 8/2009 | McCann et al. ............ 455/435.1 |

FOREIGN PATENT DOCUMENTS

JP 2007-36851 2/2007

OTHER PUBLICATIONS

R. Stewart "Stream Control Transmission Protocol" RFC4960 (IETF Network Working Group) Sep. 2007.
3GPP TS 36.300 V8.3.0; Chapter 20.2 "Control Plane" 3rd Generation Partnership Project; Technical Specification Dec. 2007.
3GPP TS 36.423 V8.0.0; Chapter 9.1 "Message Functional Definition and Content" 3rd Generation Partnership Project; Technical Specification Dec. 2007.
Extended European Search Report, Written Opinion and Abstract to the European Search Report on corresponding European Patent Application No. 081701062 dated Jun. 25, 2009.
Alcatel-Lucent; "Crossing of X2 Setup Request"; Agenda Item: 10.2. 9.5; Discussion; 3GPP TSG-RAN WG3 #63; Athens, Greece; dated Feb. 9-13, 2009; [Ref: European Search Report dated Jun. 25, 2009].
Bernard Aboba, Microsoft; IPsec Working Group; Internet-Draft; Category: Informational "IPsec-NAT Compatibility Requirements"; dated May 30, 2001; [Ref: European Search Report dated Jun. 25, 2009].
"European Search Report", mailed by EPO and corresponding to European application No. 08 170 106.2 on Jul. 16, 2010.
Fielding, R. et al., "Hypertext Transfer Protocol—HTTP/1.1; RFC2616", IETF, XP015008399 Jun. 1999.
Japanese Office Action mailed Aug. 23, 2011 for corresponding Japanese Application No. 2008-038595, with English-language translation.

* cited by examiner

*Primary Examiner* — Xavier Szewai Wong
(74) *Attorney, Agent, or Firm* — Fujitsu Patent Center

(57) ABSTRACT

To the logical links established between the first node and the second node by use of the first protocol belonging to the first layer, a signal, which is a signal of the second protocol belonging to the second layer higher than the first layer and to which signal the information identifying the transmission source node is transmitted. The first and the second nodes manage the communications links in association with the node identifier added to the signal received through the communications links.

15 Claims, 22 Drawing Sheets

FIG. 4
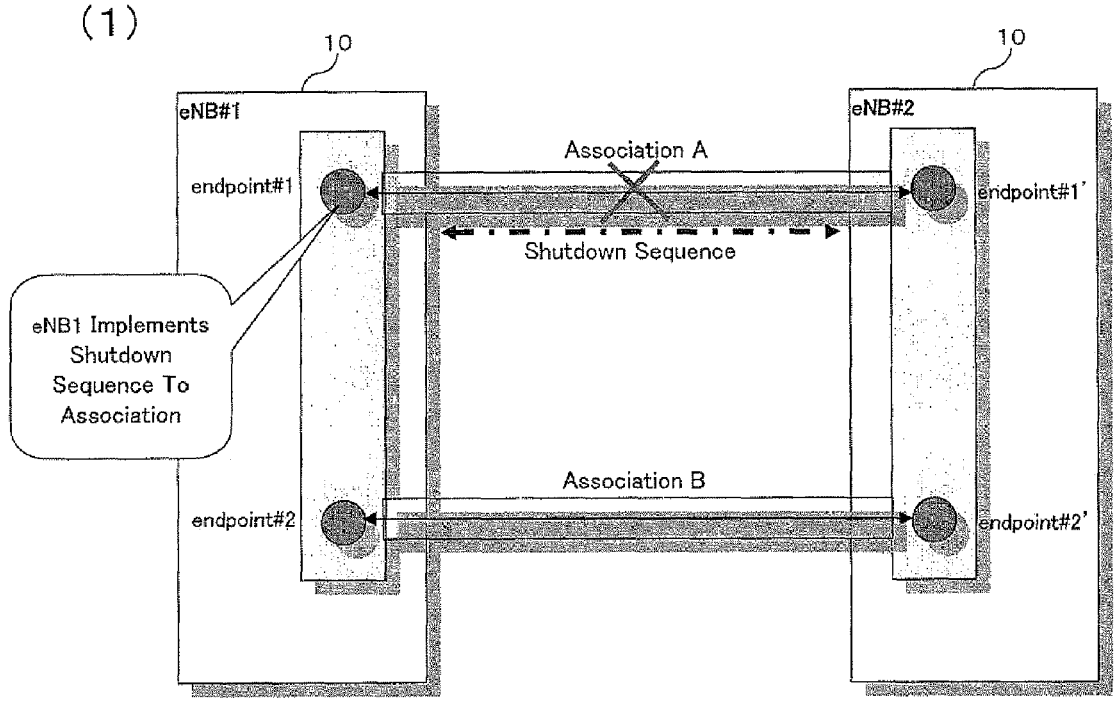
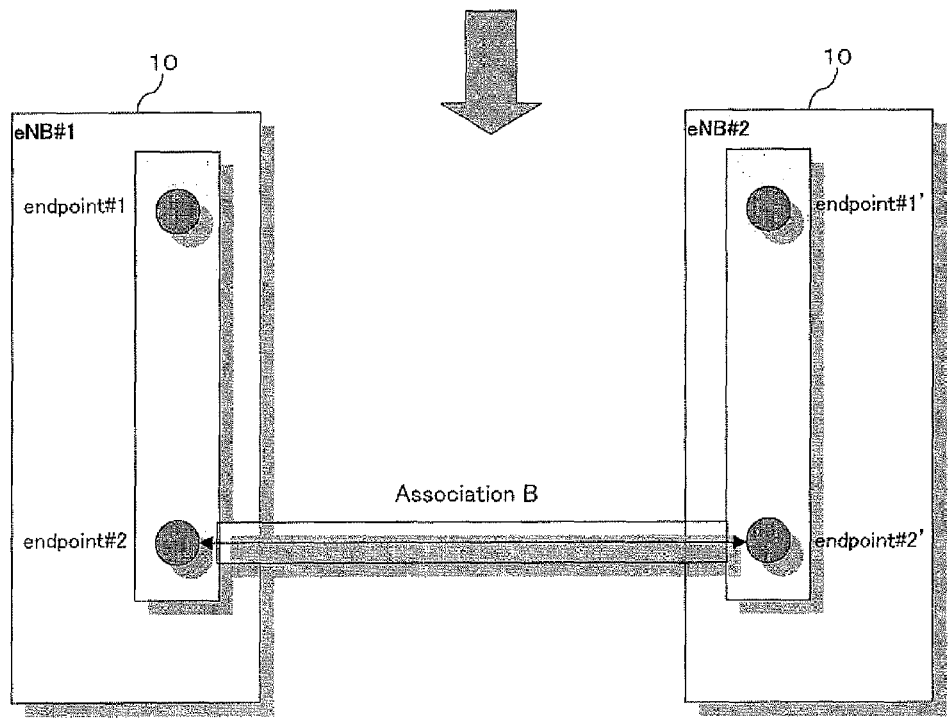

FIG. 11
(1)
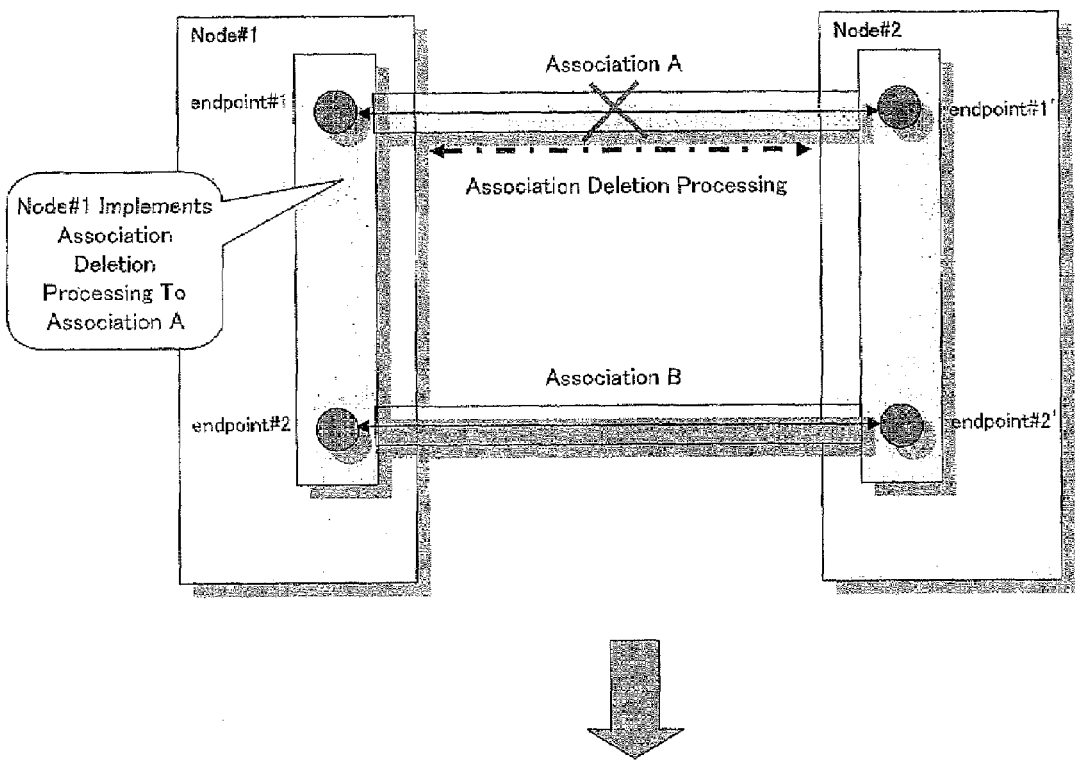
(2)
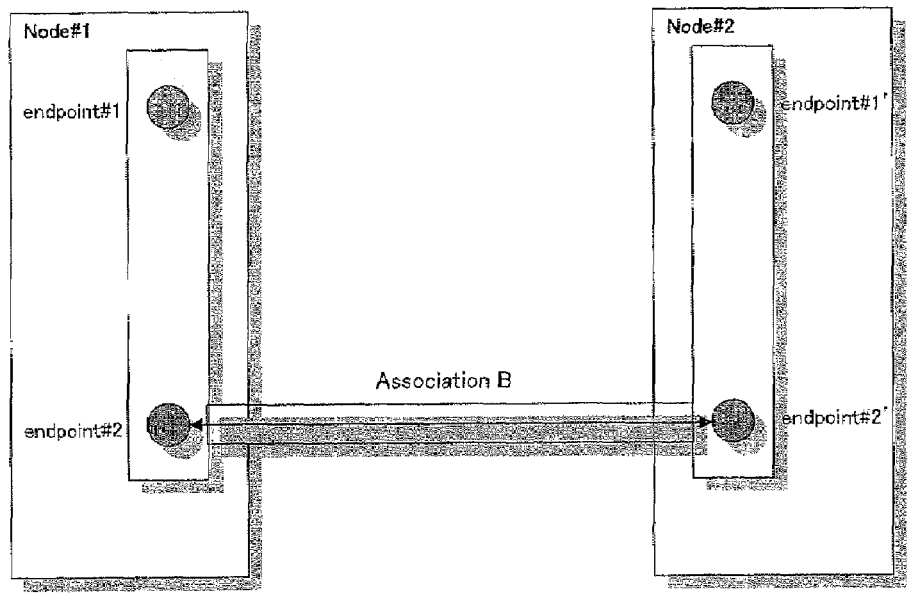

Path Of Data Packet At Inter-eNB H.O.

COMMUNICATIONS SYSTEM, COMMUNICATIONS PROCESSING METHOD, AND NODES

CROSS-REFERENCE TO RELATED APPLICATION(S)

This application is based upon and claims the benefit of priority of the prior Japanese Application No. 2008-38595, filed on Feb. 20, 2008 in Japan, the entire contents of which are hereby incorporated by reference.

BACKGROUND

1. Field

The embodiment(s) discussed herein is directed to a communications system, a communications processing method, and nodes. The embodiment(s) can be used, for example, in a case where communications is performed between the communications apparatuses (nodes) by use of the SCTP (Stream Control Transmission Protocol) or the IPSec (Security Architecture for Internet Protocol).

2. Description of the Related Art

FIG. 13 is a diagram illustrating an example of a configuration of the next generation wireless mobile communications system according to a Long Term Evolution (LTE). The system illustrated in this FIG. 13 includes, for example: more than one wireless base station (eNode B; hereinafter will be abbreviated to "eNB"), which is an entity of a wireless access network (Evolved Universal Terrestrial Radio Access Network: E-UTRAN) that a wires terminal, as an example of a user equipment (UE), accesses through a wireless link; and an MME (Mobility Management Entity)/S-GW (Serving-Gateway), which is a superordinate apparatus of the wireless base stations.

In such a system, communications between the eNB and the MME/S-GW is performed through an inter-apparatus (entity) interface called an "S1 interface", and communications between the eNBs is performed through an inter-apparatus (entity) interface called an "X2 interface".

Here, the S1 interface connects the eNB, which is a network entity of the wireless mobile communications system, with the MME/S-GW apparatus, which is a superordinate apparatus of the eNB, by use of IP (Internet Protocol), and is used for transmitting a control plane (C-Plane) signal and/or a user plane (U-plane) signal.

The X2 interface is used for connecting the eNBs each other by use of IP to transmit a control plane and/or a user plane signal. As depicted in FIG. 14, when a UE moves from a certain eNB wireless zone (cell or sector) to another targeted eNB wireless zone and then performs handover (HO), in which the connection destination is switched into the targeted eNB, the X2 interface can be used to transmit packet data (hereinafter, will also be simply called a "packet") sent from the MME/S-GW to the HO source eNB of the UE (see the dashed-dotted line). In this instance, the following non-patent document 3, for example, describes such HO processing.

In such an interface as the Si interface and the X2 interface, one of the protocols used for transmitting an inter-apparatus (inter-node) control signal is called the SCTP (Stream Control Transmission Protocol).

The SCTP means verifies the correctness of a packet on the IP based on sequence number and check sum, and is one of the protocols in the transport layer which enables information transmission while avoiding redundant packet transmission, packet loss, or the like, as far as possible, thereby ensuring reliability. For example, the SCTP is regulated by the following non-patent document 1 (RFC4960).

The network entity (hereinafter, will be also called the "node") provided with an SCTP function has one or more than one logical terminal point called an "endpoint", and establishes a logical connection (SCTP link) called an association with the endpoint of another node. At that time, the node (endpoint) has two states as a client and a server. A client is required to operate as the sender end of a node connection (association) establishment request; a server is required to operate as the receiver end of the connection establishment request.

A packet under the SCTP includes an SCTP common header and one or more than one data block called a "chunk" subsequent to the common header. The chunk can be divided into two types: a control chunk storing a control signal (message) therein; and a data chunk storing user data therein. The control chunk is sent out at the time of establishment (initialization: INIT) and release of an association.

For example, at the time of association establishment, an INIT chunk, an INIT-ACK chunk, a COOKIE-ECHO chunk, a COOKIE-ACK chunk, and so on, are used as a control chunk. On the other hand, at the time of association releasing, a SHUTDOWN chunk, a SHUTDOWN-ACK chunk, a SHUTDOWN-COMPLETE chunk, and so on, are used as a control chunk.

FIG. 15 is a diagram depicting an example of a format of an SCTP packet. As illustrated in FIG. 15, the SCTP packet has a common header and one or more than one chunk (control or user chunk) subsequent to the common header. The common header includes a sender source port (Source Port) field (16 bits), a destination port (Destination Port) field (16 bits), a verification tag (Verification Tag) field (32 bits), and a checksum field (32 bits).

In the common header, the port number of the transmission source endpoint is set to the transmission source port field, and the port number of the destination endpoint is set to the destination port field. With such port numbers, associations are identified. To the verification tab field, key information for preventing arrival of an old SCTP packet (identifying the currently effective association) from the prior association is set.

To the checksum field, the checksum of an SCTP packet for ensuring the completeness of data [detecting a broken packet (transmission error)] when the SCTP packet is transmitted through an IP network.

In the chunk subsequent to the common header, the type and the length of that chunk are indicated using the leading 32 bits, and user data or control data is stored thereafter. In this instance, FIG. 15 illustrates an example of a format of an SCTP packet in which N-number of user chunks are set subsequently to the common header, a single SCTP packet being thereby set.

Next, FIG. 16 depicts an example of a format of an initialization (INIT) chunk, which is a control chunk used for association establishment. FIG. 17 depicts an example of a format of an initialization response (INIT-ACK) chunk, which is a response to the above mentioned control chunk (initialization chunk).

As depicted in FIG. 16, the INIT chunk, which means a request for association establishment, is indicated to be an INIT chunk when the chunk type (Type)=1, and the initialization value of the information necessary for association establishment is set thereto.

In contrast, as illustrated in FIG. 17, the INIT-ACK chunk is indicated to be an INIT-ACK chunk when the chunk type=2, and the endpoint (server) that has received the INIT chunk is added with information (cookie) or the like identifying the association establishment request generated based on the reception information. According to the SCTP, the use of a cookie makes it possible to avoid impacts (shortage of system resources or the like) of Dos (Denial of Service) attacks.

FIG. 18 depicts an example of a handshaking (4-way handshaking) sequence at the time of SCTP association establishment in the SCTP. In the beginning, the client-side endpoint sends an INIT chunk to the server-side endpoint for association establishment.

Upon reception of the INIT chunk, the server-side endpoint sends an INIT-ACK chunk containing a cookie to the client-side endpoint.

Upon reception of the INIT-ACK chunk, the client-side endpoint extracts the cookie and sends the extracted cookie, in the form of being contained in a COOKIE-ECHO chunk, to the server-side endpoint.

Upon reception of the COOKIE-ECHO chunk, the server-side endpoint extracts the cookie and then sends a COOKIE-ACK chunk.

In the above described manner, an association between the client and the server is established.

FIG. 19 is a diagram illustrating an example of a protocol stack of the control plane of the Si interface in the LTE; FIG. 20 is a diagram illustrating an example of a protocol stack of the control plane of the X2 interface in the LTE. In this instance, these are described in, for example, the following non-patent document 2.

As illustrated in FIG. 19, according to the S1 interface, the protocol stack of the control plane is regulated as the physical layer, the data link layer, the IP layer, the SCTP layer, the S1-AP (application) layer, in order, from the lower layer. On the other hand, according to the X2 interface, as illustrated in FIG. 20, the protocol stack of the control plane is regulated as the physical layer, the data link layer, the IP layer, the SCTP layer, the X2-AP (application) layer, in order, from the lower layer. Here, the Si interface and the X2 interface differ from each other in operation of association establishment that the entities (eNB and MME/S-GW) employ.

In the section of the S1 interface, as indicated in FIG. 21(A), for example, the eNB and the MME/S-GW operate as a client and a server, respectively, and the SCTP association, as described above, is established (handshaking).

In contrast, in the section of the X2 interface, as indicated in FIG. 21(B), for example, the eNB is required to be capable of operating both as a client and a server and to realize handshaking with the opposite eNB.

[Non-patent Document 1] RFC4960 (IETF Network Working Group)

[Non-patent Document 2] 3GPP TS36.300 V8.3.0; Chapter 20.2

[Non-patent Document 3] 3GPP TS36.423 V8.0.0; Chapter 9.1

As described above, in a case where an SCTP association is established between the eNBs for realizing communications between the eNBs through the X2 interface, the eNBs can operate both as a client, which is a transmission source of a connection establishment request (INIT chunk), and a server, which sends back a response (INIT-ACK chunk) upon reception of the request. Therefore, the opposite two eNBs are capable of mutually operating as clients.

In this case, as illustrated in FIG. 22, when the different eNBs each having more than one LAN (Local Area Network) port sends a connection establishment request (INIT chunk) to the opposite eNB, both operating as clients, there is a possibility that two or more (redundant) associations are established between the eNBs.

That is, as illustrated in (1) of FIG. 22, it is assumed here that, one eNB#1, which operates as a client, uses transport address a (IP address=192.168.0.1; port number=100) to send a connection establishment request (INIT chunk) toward transport address c (IP address=192.168.0.3; port number=200) indicating the destination endpoint.

At that time, if the opposite eNB#2 also uses transport address d (IP address=192.168.0.4; port number=200) indicating the transmission source endpoint to send a connection establishment request (INIT chunk) to transport address b (IP address=192.168.0.2; port number=100), two or more associations (A and B) are established between the eNB#1 and the eNB#2 as illustrated in (2) of FIG. 22.

Such a case may occur in, for example, the already described HO processing. That is, it may occur after the UE moves from the wireless zone of the first eNB to that of another (the second) eNB, or in a case where the UE or another UE moves from the wireless zone of the second eNB to that of the first eNB.

However, it may be impossible for a communications application (a protocol of the application layer) used in inter-node communications such as HO processing to identify (specify) the eNB from SCTP information belonging to the transport layer lower than the application layer or IP information belonging to the network layer lower than the transport layer.

That is, it is possible to obtain the parameters that regulates the port numbers of the opposite eNB and its associations from the SCTP shared header information indicated in FIG. 15 and information (parameters) contained in the INIT chunk and the INIT-ACK chunk depicted in FIG. 16 and FIG. 17, and it is also possible to obtain the IP address from the IP belonging to the layer (network layer) lower than the transport layer which the SCTP belongs to. However, since such parameters are incapable of expressing with which one of the eNBs an association has been established, it is impossible for either of the eNB#1 and the eNB#2 to recognize that more than one association has been established between the nodes.

In this manner, when more than one association is established between the eNBs, association management more than need to be is required, so that an increase in memory amount to be allocated to association management in the eNB results in running out of apparatus resources, and that the processing amount such as a heartbeat keep-alive mechanism due to heartbeat generated per association is increased. These may cause deterioration of the performance of the eNBs.

In this instance, the heartbeat keep-alive mechanism means processing for evaluating whether or not an unused destination address is active by means of periodically sending a heartbeat packet to the address that has not been used for data transmission for a certain time period.

SUMMARY

For example, the following items may be used.
(1) As a generic aspect, there provided is a communication system including a first node and a second node operable to communicate with the first node, the system including: a means that transmits a signal of a second protocol belonging to a second layer, which signal has a source node identifier, to a logical communication link established between the first node and the second node by using a first protocol belonging to the first layer, the second layer being higher than the first layer; and a means that manages the communication link in association with the node identifier added to the signal received through the communication link.

(2) As another generic aspect, there provided is a method of communication processing in a communication system including a first node and a second node operable to communicate with the first node, the method comprising: transmitting a signal of a second protocol belonging to a second layer, which signal has a source node identifier, to a logical communication link established between the first node and the second node by using a first protocol belonging to the first layer, the second layer being higher than the first layer; and managing the communication link in association with the node identifier added to the signal received through the communication link.

(3) The management may include processing of identifying, based on the node identifier, logical communication links redundantly established between the first node and the second node and releasing either one of the links.

(4) The node executing the releasing may be a node having the node identifier, as number information, smaller than that of the other node.

(5) The logical communication link to be subjected to the releasing may be established by a node serving as a source node and having the number information smaller than that of the other node.

(6) The first node and the second node may be a radio base station, respectively; the first protocol may be a Stream Control Transmission Protocol (SCTP) belonging to a transport layer as the first layer; and the signal of the second protocol maybe an inter-base station control signal belonging to an application layer as the above second layer.

(7) The inter-base station control signal may be a control signal relating to handover processing.

(8) The first node and the second node may respectively have a communication function used for a security architecture for Internet protocol (IPSec) that belongs to a network layer as the first layer, and the signal of the second protocol may be an inter-node control signal belonging to an application layer as the second layer.

(9) Another generic aspect, there provided is a second node operable to communicate with a first node, the second node comprising: a reception means operable to receive a signal of a second protocol belonging to a second layer, which signal has a node identifier of the first node, from a logical communication link established between the nodes by using a first protocol belonging to a first layer, the second layer being higher than the first layer; and a management means operable to manage the communication link in association with the node identifier added to the signal received by the reception means.

(10) The second node may further include: a transmitting means operable to transmit a signal of the second protocol, which signal has a node identifier of the local (second) node added thereto, to the above communications link.

(11) The management means may include: an identifying unit to identify, based on the node identifier, logical communication links redundantly established between the nodes; and a releasing unit to release either one of the identified communication links.

(12) The releasing unit may execute the releasing, when the node identifier, as number information, of the local (second) node is smaller than that of the node identifier received from the first node.

(13) The releasing unit may release the link established by the local (second) node serving as a source node.

(14) The first node and the second node maybe a radio base station, respectively; the first protocol may be a Stream Control Transmission Protocol (SCTP) belonging to a transport layer as the first layer; and the signal of the second protocol maybe an inter-base station control signal belonging to an application layer as the second layer.

(15) The inter-base station control signal may be a control signal relating to handover processing.

(16) The first node and the second node each may be a node having a communication function used for a security architecture for Internet protocol (IPSec) as the first protocol belonging to a network layer as the first layer, and the signal of the second protocol may be an inter-node control signal belonging to an application layer as the second layer.

(17) As still another generic aspect, there provided is a first node operable to communicate with a second node, the first node including: a node identifier adding means operable to add a node identifier of the first node to a signal to be transmitted to a logical communication link established between the nodes by using a first protocol belonging to a first layer, which signal is a signal of a second protocol belonging to a second layer higher than the first layer; and a transmitting means to transmit the signal of the second protocol, which signal has the node identifier, to the communication link.

Additional objects and advantages of the embodiment(s) will be set forth in part in the description which follows, and in part will be obvious from the description, or may be learned by practice of the embodiment(s). The object and advantages of the invention will be realized and attained by means of the elements and combinations particularly pointed out in the appended claims.

It is to be understood that both the foregoing general description and the following detailed description are exemplary and explanatory and are not restrictive of the embodiment, as claimed.

BRIEF DESCRIPTION OF THE DRAWINGS

FIG. 4 is an image diagram for describing an operation of removing an association redundantly established between the eNBs in the wireless communications system illustrated in FIG. 1;

FIG. 11 is an image diagram for describing an operation of removing an association redundantly established between the nodes in the wireless communications system illustrated in FIG. 7;

DESCRIPTION OF EMBODIMENT(S)

Referring to the relevant drawings, a description will be made hereinafter of embodiment(s). Here, the embodiment(s) described below is just an example, and it does not intend to exclude application of a variety of modifications and techniques not clarified in the following description. That is, the embodiment(s) is capable of being implemented with various changes or modifications added thereto (for example, combining the embodiments) without departing from the inventors' concept.

[A] Overview

An association, as an example of a logical communications link established through an X2 interface between nodes (for example, eNBs), is capable of being used in transmitting an SCTP packet (control chunk) between the eNBs. For example, in an HO sequence, a "Handover Request" message, a "Handover Request Acknowledge" message, or the like, is capable of being transmitted as an example of a control plane signal on the X2 interface.

Adding identification information (node ID) of a node (eNB) to the parameters in these messages makes it possible to recognize the opposite eNB, which transmits and receives an HO sequence control plane signal by use of the association. In this instance, the HO sequence is an example of inter-node communications. Such inter-eNB communications includes other types of communications (information transmitting and receiving) used for activation and reactivation of the nodes (eNBs). Hence, it is possible to give a node ID to a control plane signal in the communications (the same goes for in the following description).

Therefore, an eNB recognizes the opposite eNB in the association. In a case where more than one association is established to one and the same eNB, removal of a redundant association becomes available by means of sending signals such as a shutdown signal (SHUTDOWN chunk) and an abort signal (ABORT chunk) to such a redundant association. This makes it possible to reduce the memory amount used in eNBs and the association management processing amount.

[B] First Embodiment

Figure 1:
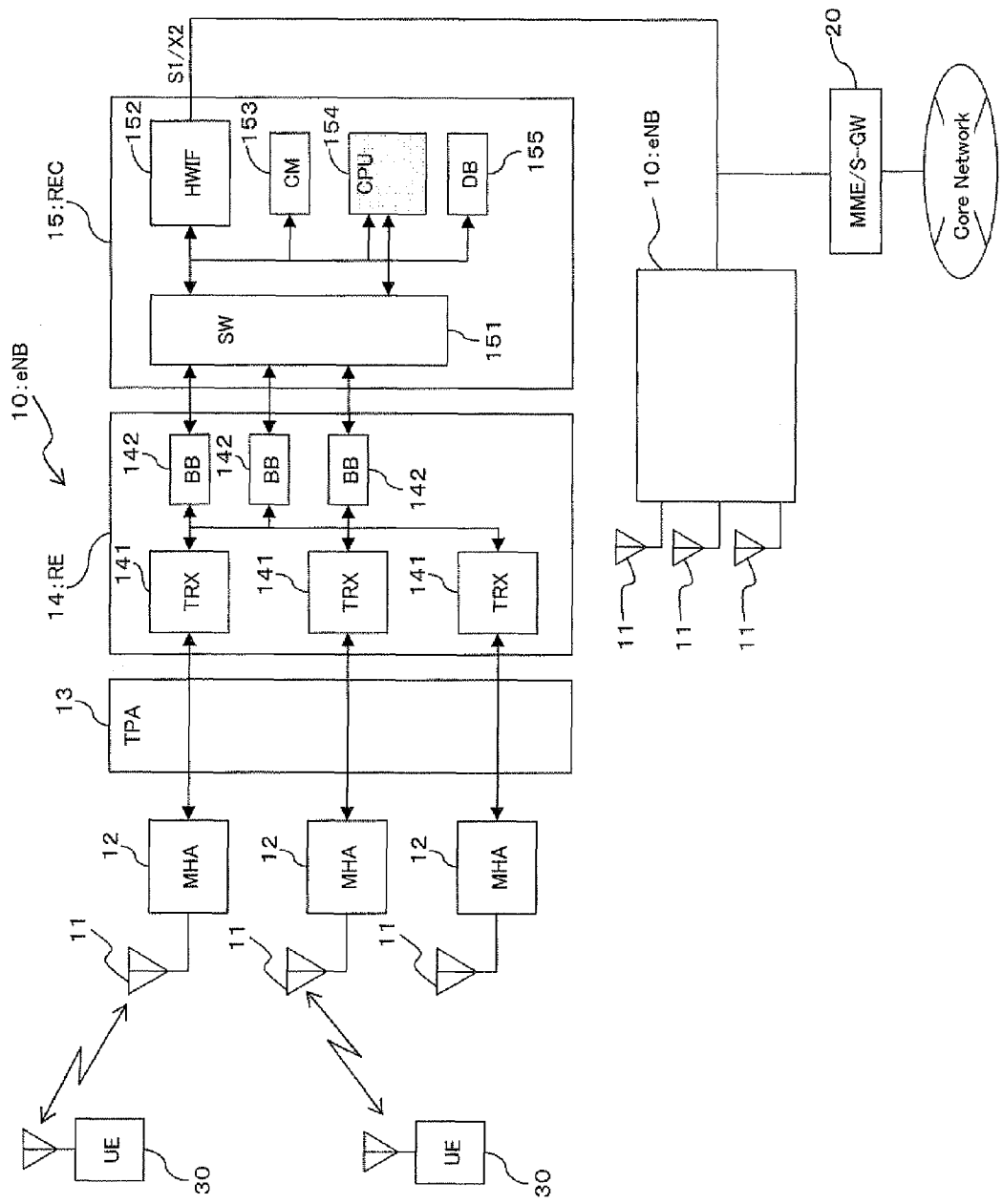
FIG. 1 is a diagram illustrating an example of a wireless communications system according to a first embodiment.

FIG. 1 is a diagram illustrating an example of a wireless communications system according to a first embodiment. The wireless communications system exemplified in FIG. 1 includes: a plurality of eNBs 10 as an example of an entity (node) in a wireless access network; an MME/S-GW 20, which is a network entity serving as a superordinate apparatus of the eNBs 10; and one or more than one UE 30, which performs communications with the eNBs 10 in a wireless zone (cell or sector) formed by the eNB 10.

Figure 13:
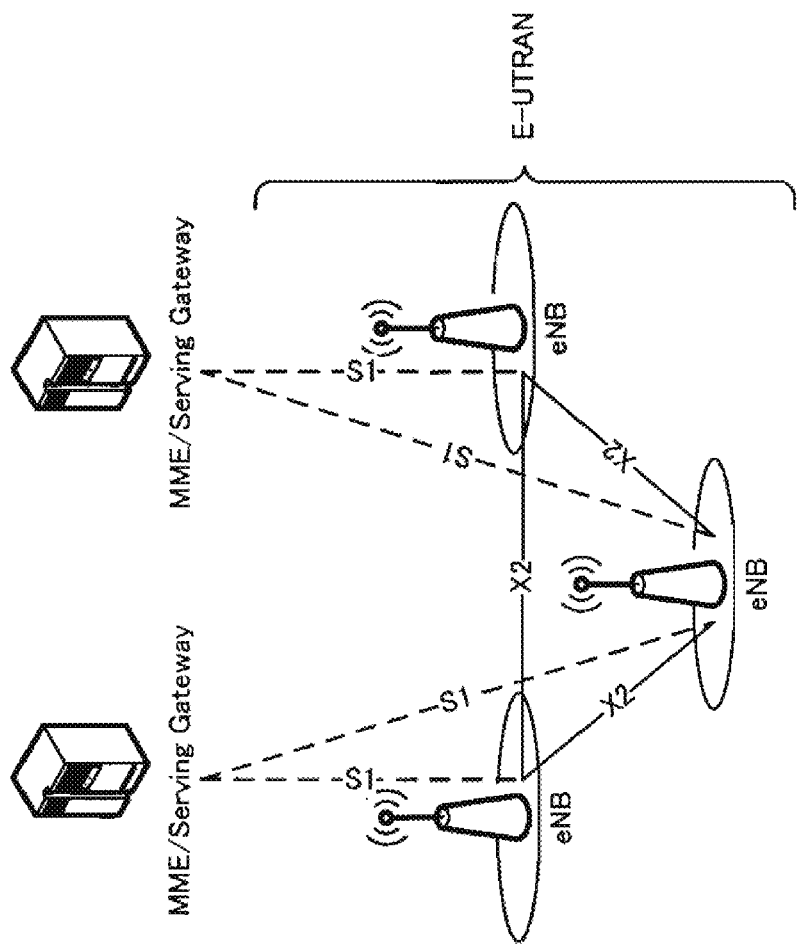
FIG. 13 is a diagram illustrating an example of a construction of an LTE wireless communications system.
Figure 14:
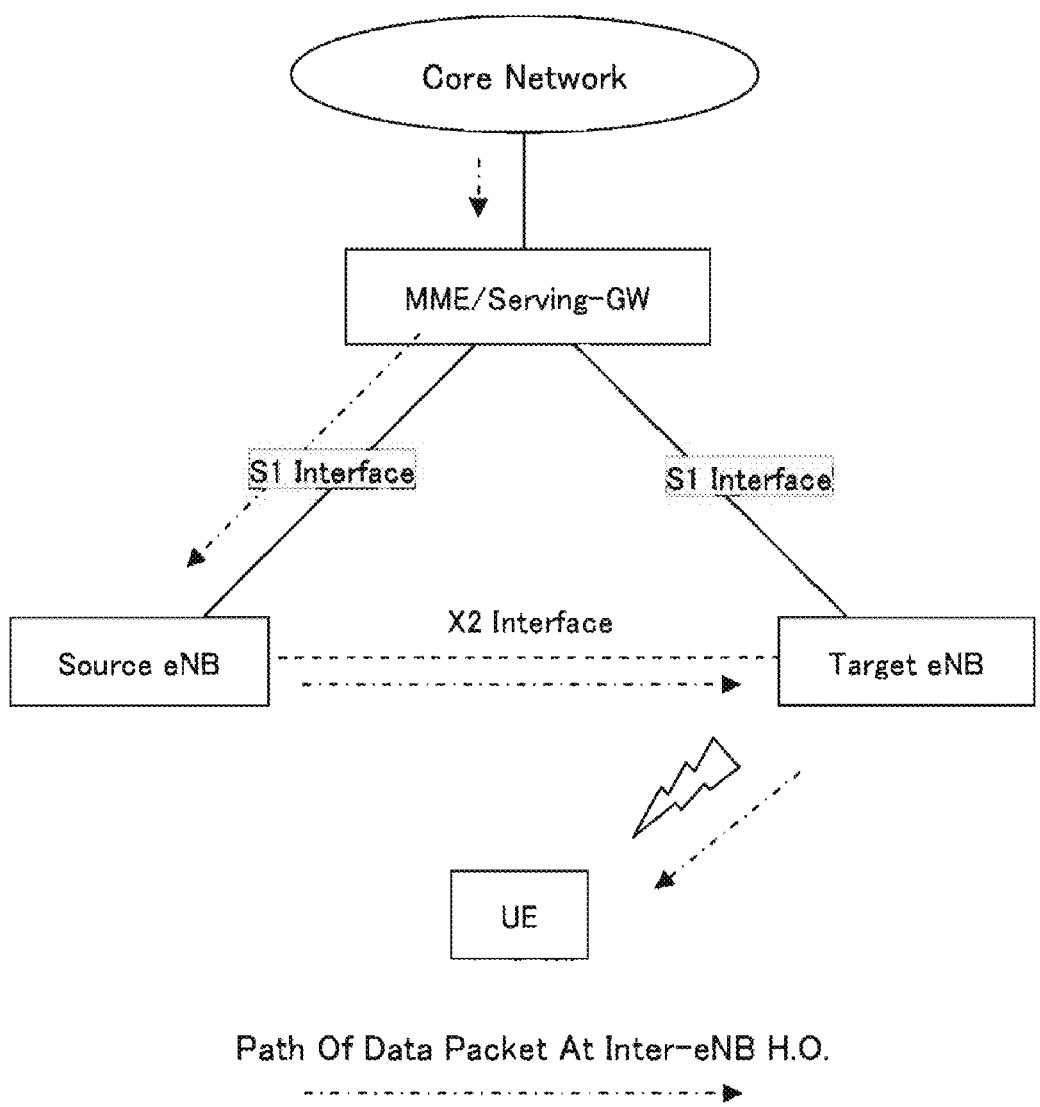
FIG. 14 is an image diagram for describing HO processing performed in an LTE wireless communications system.
Figure 15:
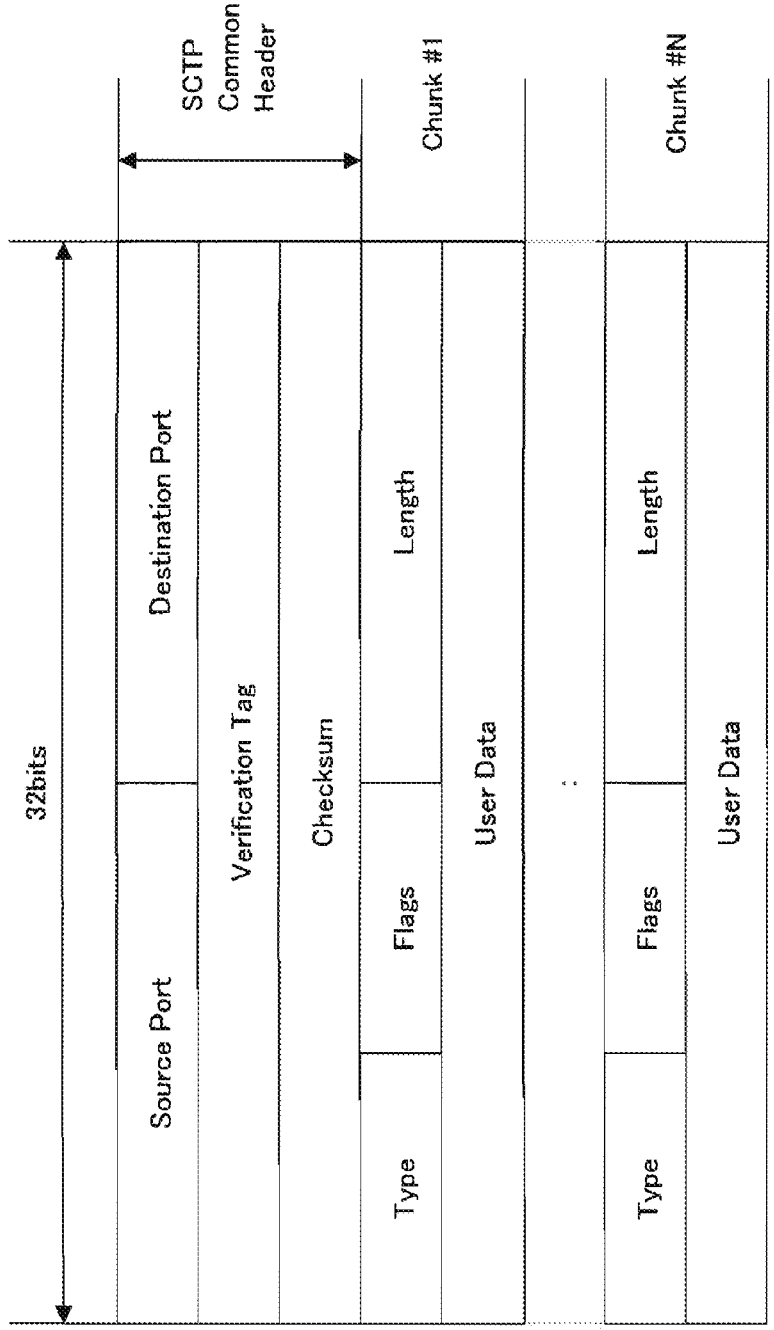
FIG. 15 is a diagram illustrating an example of a format of an SCTP packet.
Figure 16:
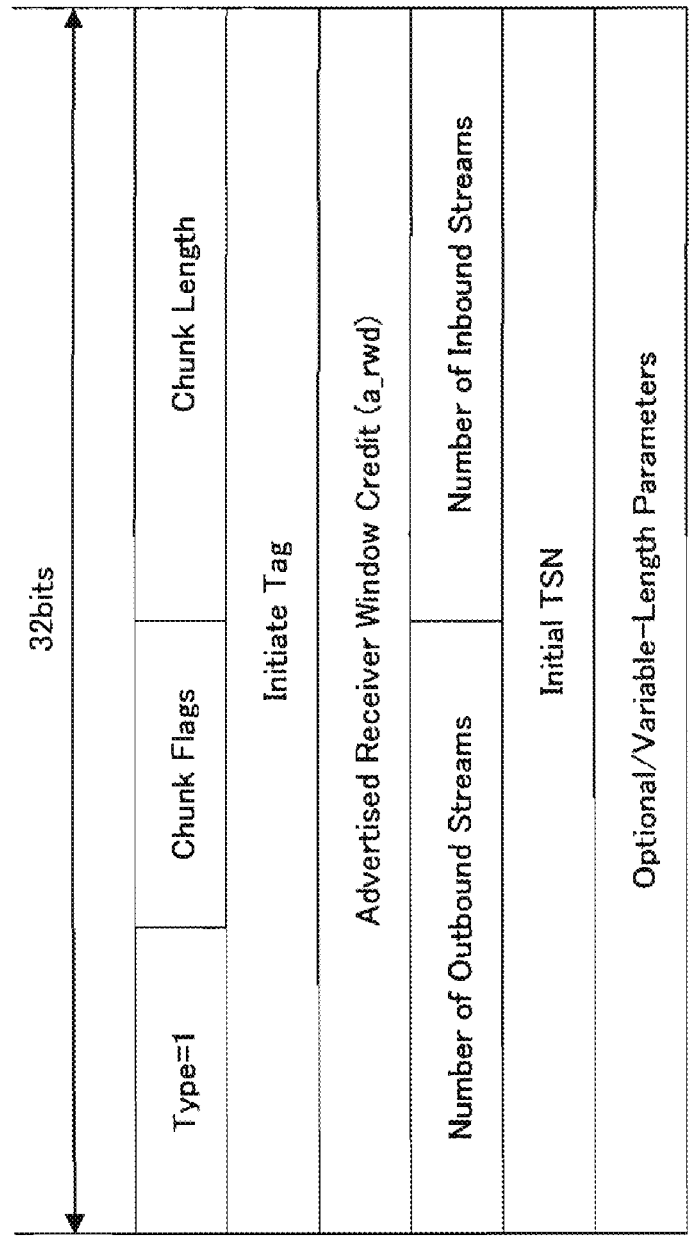
FIG. 16 is a diagram illustrating an example of a format of an INIT chunk.
Figure 17:
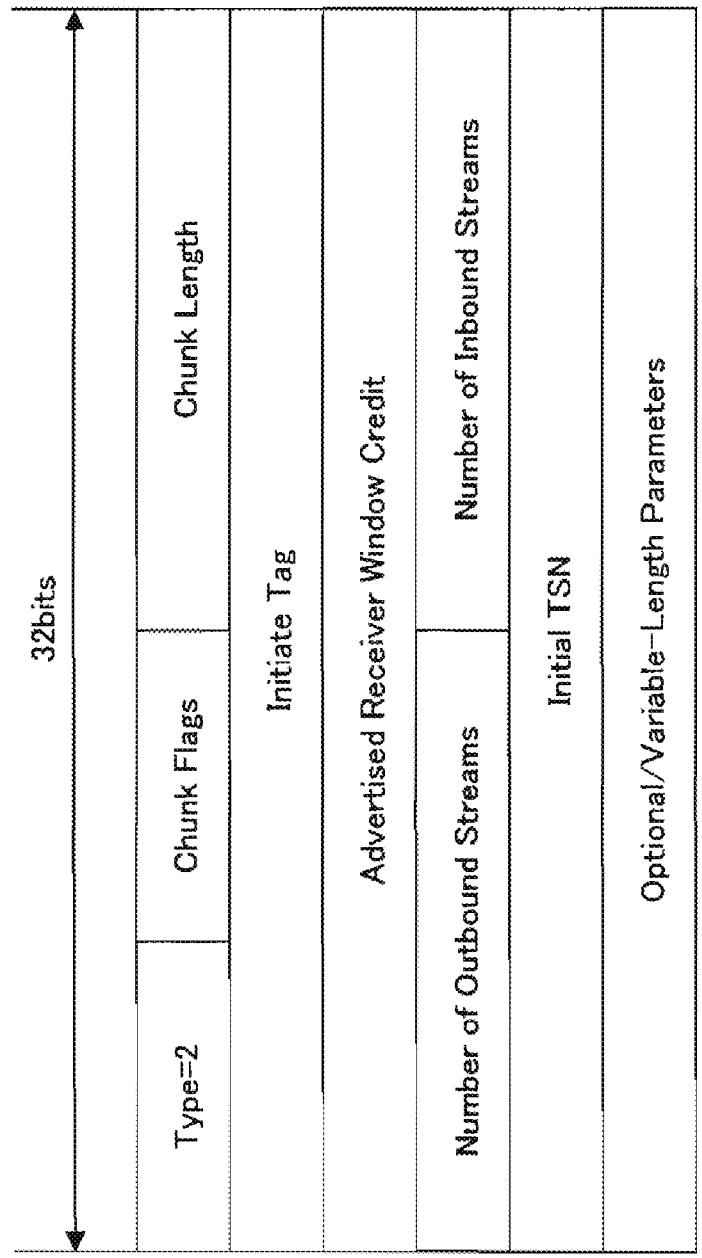
FIG. 17 is a diagram illustrating an example of a format of an INIT-ACK chunk.
Figure 18:
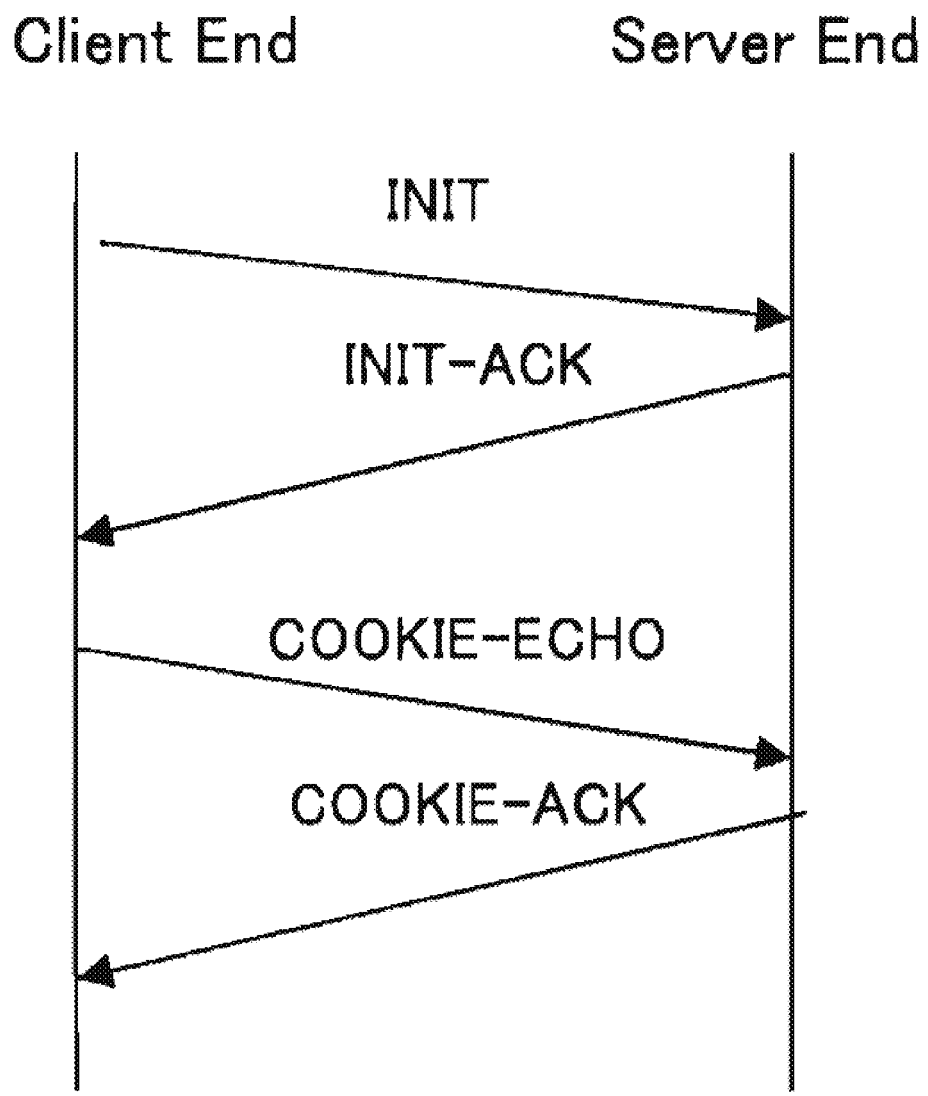
FIG. 18 is a sequence diagram illustrating an example of handshaking performed at the time of establishment of an SCTP association.
Figure 19:
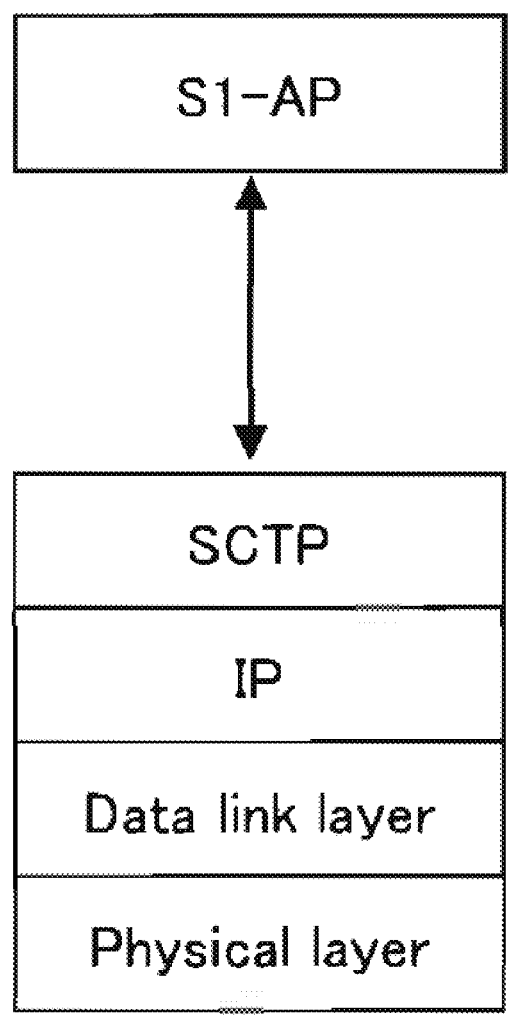
FIG. 19 is a diagram illustrating an example of a protocol stack of the control plane of an Si interface.
Figure 20:
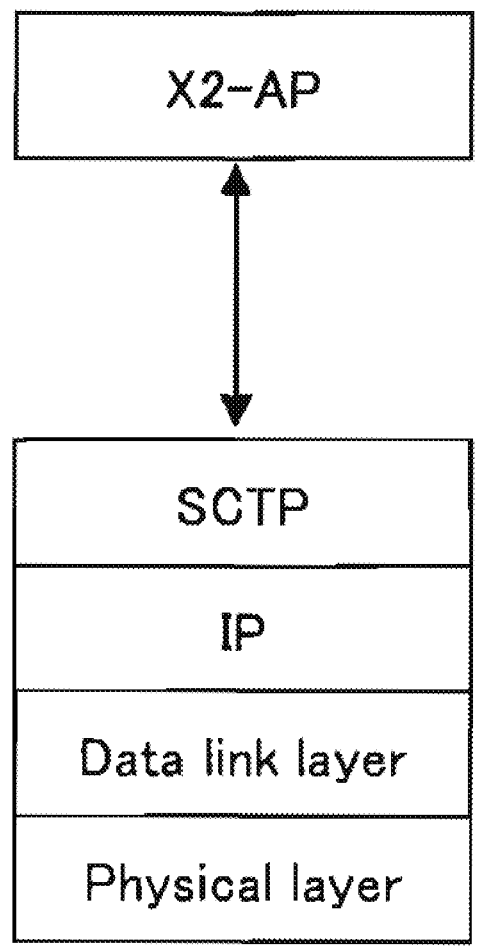
FIG. 20 is a diagram illustrating an example of a protocol stack of the control plane of an X2 interface.
Figure 21A:
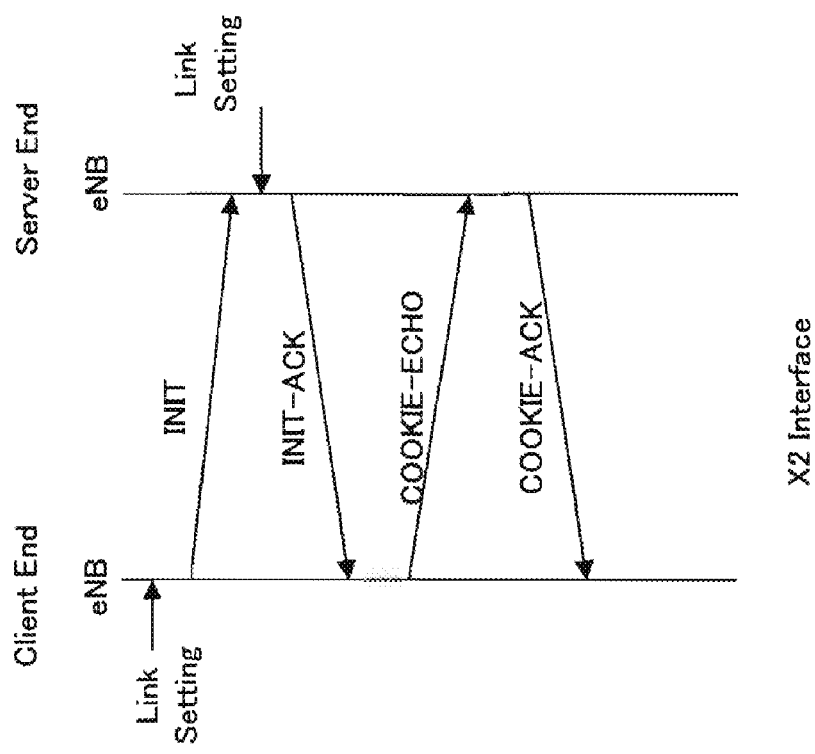
FIG. 21(A) is a diagram illustrating an example of an SCTP connection start sequence (connection start sequence on the S1 interface) in an LTE wireless communications system.
Figure 21B:
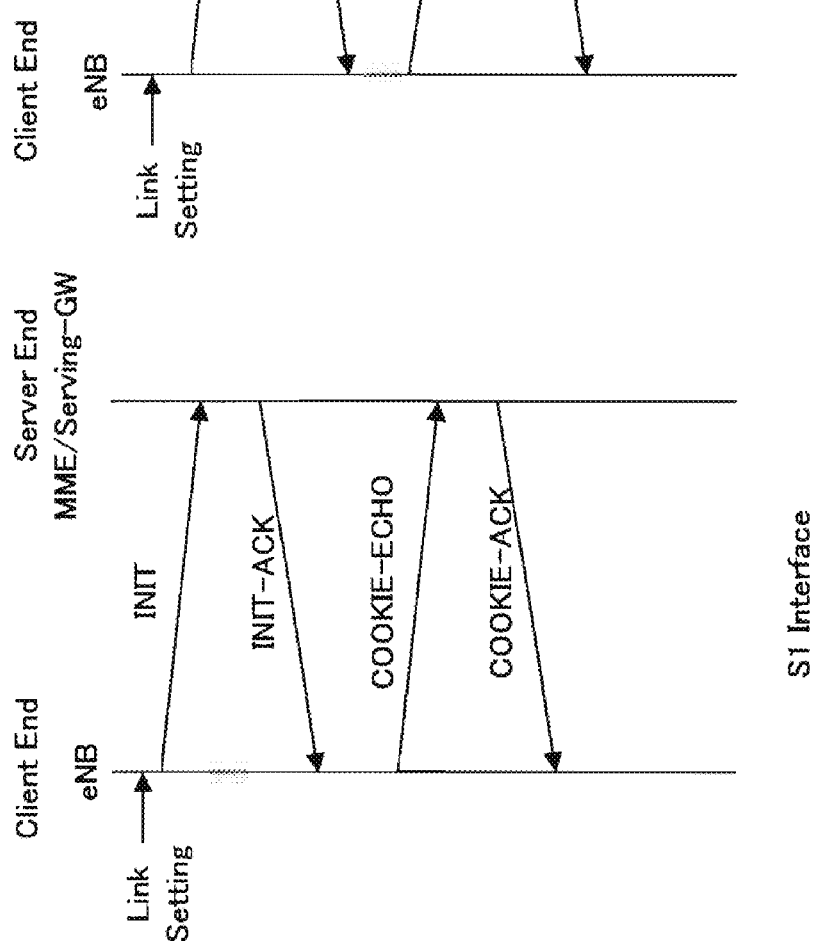
FIG. 21(B) is a diagram illustrating an example of an SCTP connection start sequence (connection start sequence on the X2 interface) in an LTE wireless communications system.

As illustrated in FIG. 13 and FIG. 14, the eNB 10 is capable of communicating with other eNBs 10 through the X2 interface, and it is also capable of communicating with the MME/S-GW 20 through the S1 interface.

The UE 30 is capable of switching the destination eNBs 10 (performing HO) in response to their movement. In the HO sequence, between the HO source eNB 10 and the HO target eNB 10, a control plane signal such as a "Handover Request" message, a "Handover Request Acknowledge" message is capable of being transmitted and received by use of, for example, an SCTP packet as one example of a control chunk through the X2 interface.

The eNB 10 illustrated in FIG. 1, for example, include: one or more than one antenna 11; one or more than one amplifier (MHA: Mast Head Amplifier) 12; a Transmit Power Amplifier (TPA) 13; Radio Equipment (RE) 14 having one or more than one Transmitter Receiver (TRX) 141 and one or more than one base band unit (BB) 142; and a Radio Equipment Controller (REC) 15 having a switch (SW) 151, a High-way Interface (HWIF) 152, a Common Memory (CM) 153, a Call Processing Unit (CPU) 154, and a Date Base unit (DB) 155.

Here, the antenna 11 is a wireless interface that transmits and receives a wireless signal between the eNB 10 and the UE 30.

The MHA 12 amplifies a wireless signal transmitted and received between the antenna 11 and the TPA 13.

The TPA 13 amplifies a wireless signal transmitted and received between the MHA 12 and the RE 14 (TRX 141).

In the RE 14, the TRX 141 performs frequency conversion (up-conversion) of a transmission baseband signal (a downlink signal destined to the UE 30) from the BB 142 into a signal at a wireless frequency, and then sends the converted signal to the TPA 13. The TRX 141 also performs frequency conversion (down-conversion) of a wireless signal (an uplink signal) received from the TPA 13 into a signal at a baseband frequency, and then sends the converted signal to the BB 142.

The BB 142 performs baseband processing including predetermined encoding, modulation, or the like, to a transmission signal from the SW 151 of the REC 15, and then sends the signal having been subjected to the baseband processing to the TRX 141. The BB 142 also performs baseband processing including predetermined demodulation, decoding, or the like, to the baseband signal received from the TRX 141, and then sends the signal having been subjected to the baseband processing to the SW 151 of the REC 15.

In the REC 15, the SW 151 switches the connections between the BBs 142 and the HWIF 152 under control from the CPU 154 in such a manner that the signal from the BB 142 is output to the HWIF 152 and that the signal from the HWIF 152 is output to any one of the BBs 142.

The HWIF 152, which has functions as the above mentioned S1 interface and X2 interface, communicates with another eNB 10 and MME/S-GW 20. In the embodiment, this HWIF 152 has functions as a transmitting means for transmitting a control plane signal through the S1 interface and the X2 interface and a receiving means for receiving a control plane signal through the S1 interface and the X2 interface.

The CM 153 holds data for use in an operation of the CPU 154. In this CM 153, it can be occurred that data of the DB 155 is read out and expanded therein.

The CPU 154 controls the SW 151 based on data (containing application data for call control, setting data, or the like) held in the CM 153 and/or the DB 155, to transmit signals transmitted and received between the UE 30 and another eNB 10 and MME/S-GW 20 to appropriate paths. Further, the CPU 154 of the present example performs various types of processing as the following: establishing and releasing an association with another eNB 10; adding the ID of the local node (eNB) to a control plane signal transmitted and received on the X2 interface; associating the node ID received by a control plane signal from the opposite node with an association; recognizing a redundant association; and removing (releasing) the redundant association.

That is, the CPU 154 has functions as a management means for managing associations in association with the node ID added to the control plane signal received by the HWIF 152 through the X2 interface and as a node ID adding means for adding the node ID of the local node to a control plane signal to be sent to the X2 interface.

Further, the CPU 154, as an example of the above mentioned management means, has functions as a recognizing unit for recognizing associations redundantly established between the local node and another (opposite) eNB 10 and a releasing unit for removing (releasing) either one of the recognized associations, based on the above mentioned node ID.

The DB 155 holds data used for the eNB 10 to perform operations. This DB 155 registers therein also information for managing associations to be established with and released from another eNB 10. For example, it is possible to manage such information as association numbers, the endpoint used by the local node 10, the transmission source/transmission target port number (SCTP parameters), the IP address of the local node 10 (endpoint), and the IP address of another node 10 (endpoint).

Figure 2:
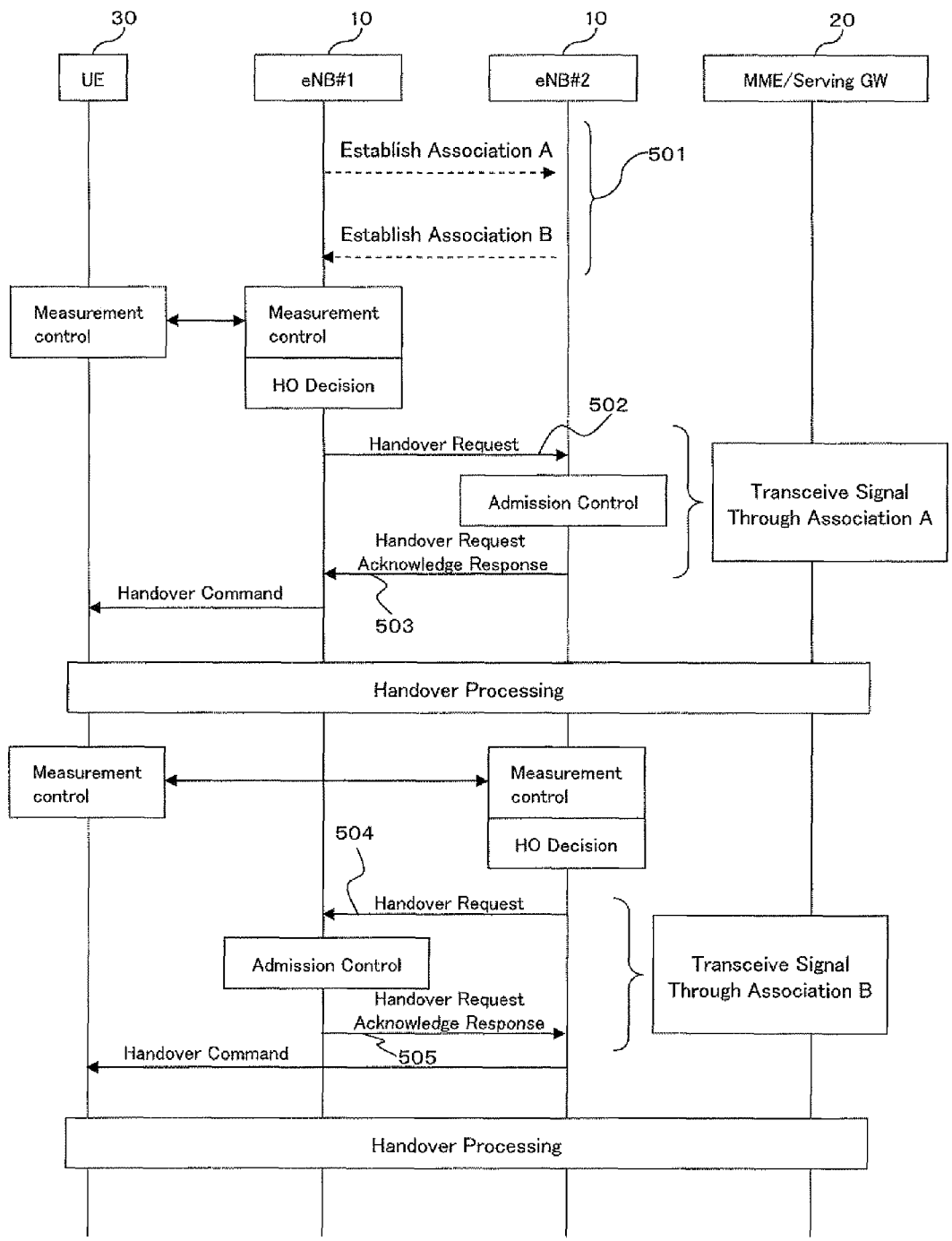
FIG. 2 is a sequence diagram illustrating an example of an HO sequence according to the wireless communications system illustrated in FIG. 1.

Next, FIG. 2 depicts an example of an inter-eNB HO sequence in a case where more than one association is established between certain eNBs 10 (between eNB#1 and eNB#2). Taking this sequence as an example, a description will be made hereinbelow of operations of identifying and removing redundant ones of the two or more associations established between the eNB#1 and the eNB#2.

It is assumed here that an SCTP association establishing operation in which eNB#1 and eNB#2 mutually belong to the transport layer as clients has been implemented and two or more associations A and B have been established (processing 501). That is, in the present example, the transport layer is an example of the first layer; the SCTP is an example of the first protocol belonging to the first layer.

In this case, the eNB#1 (CPU 154) itself operates as a client, and manages the association A established between the eNB#1 and eNB#2 and the association B (the opposite eNB is unclear) established by the eNB#1 which operates as a server.

Figure 22:
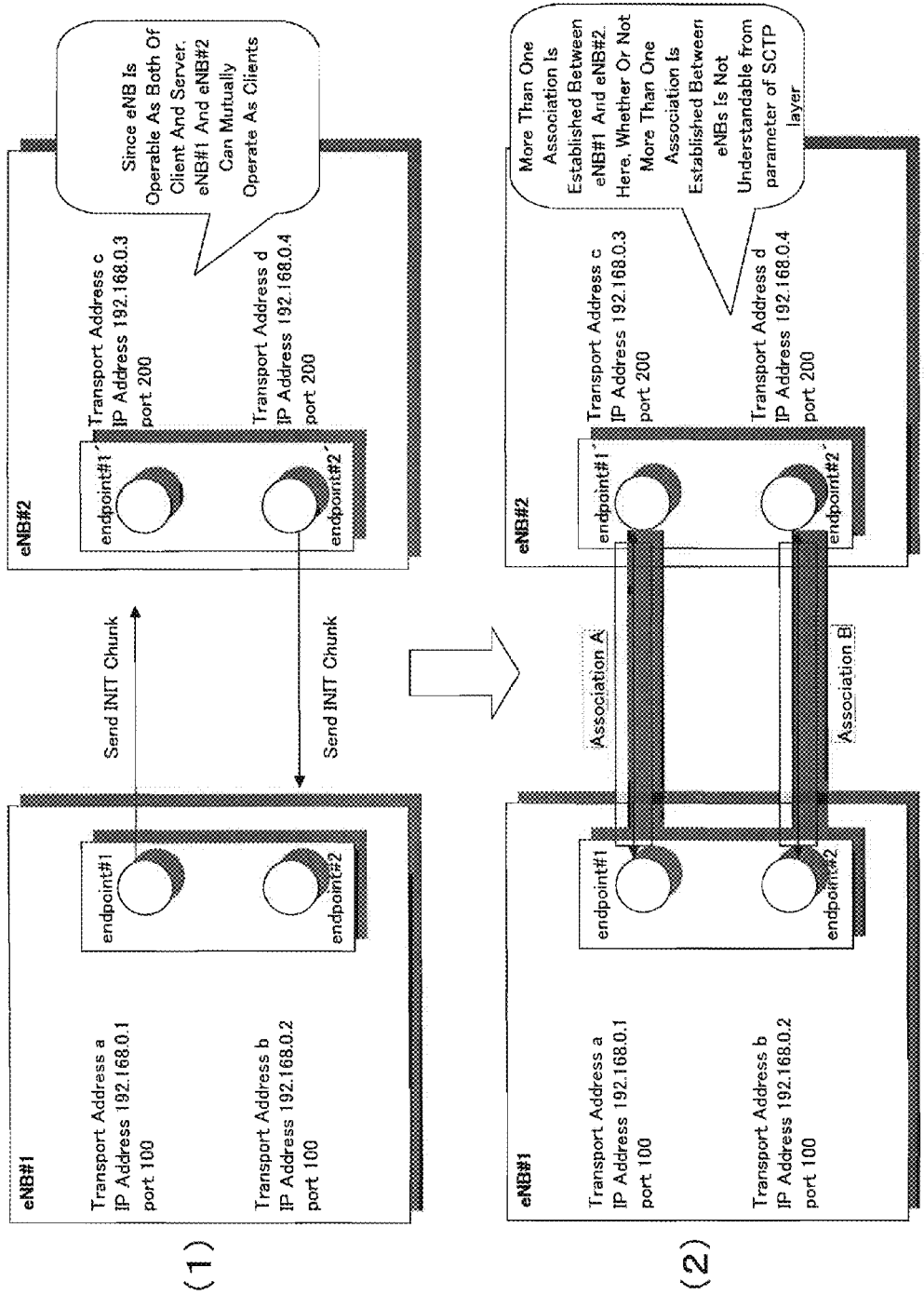
FIG. 22 is an image diagram illustrating a way in which more than one association is established between the nodes (eNBs).

For example, similar to FIG. 22, it is assumed that the eNB#1 (CPU 154) sends a connection establishment request (INIT chunk) toward the transport address c (IP address=192.168.0.3; port number=200) which expresses a destination endpoint, by using the transport address a (IP address=192.168.0.1; port number=100).

On the other hand, it is assumed that the eNH#2 (CPU 154) sends a connection establishment request (INIT chunk) toward the transport address b (IP address=192.168.0.2; port number=100) which expresses a destination endpoint, by using the transport address d (IP address=192.168.0.4; port number=200) which expresses the source end point.

In this case, the eNB#1 manages information about associations A and B in the form of an association management table or the like. An example thereof is illustrated in (1) of FIG. 6. In the example in (1) of FIG. 6, the eNB#1 manages information, such as "the association number", which identifies an association established thereby, "an association establishment availability evaluation flag", which indicates whether or not association establishment is available, information identifying the "end point in use" of the local node, "the transmission source port number (SCTP parameter)", "the local node IP address", "the destination port number (SCTP parameter)", and "the IP address of another node", in the form of a data table. In this instance, this association management table is held in, for example, in the DB 155.

Likewise, the eNB#2 (CPU 154) manages the association B established with the eNB#1 by the eNB#2 (CPU 154) itself, operating as a client, between the eNB#2 and the association A [the opposite eNB (node ID) is unclear] established by the eNB#2 operating as a server in the association management table (DB 155) in the local node #2. In this instance, the association management table in the eNB#2 is equivalent to the association management table in the eNB#1 exemplified in (1) of FIG. 6 in which the transmission source port number and the destination port number are replaced with each other and in which the IP address of the local node is replaced with the IP address of another node.

Subsequently, if the eNB#1 determines to perform the HO to the eNB#2 in response to the movement of the UE 30 communicating with the serving eNB#1, the eNB#1 performs communications relating to HO processing through the eNB#1 and eNH#2 interfaces by an HO application.

That is, the eNH#1 (CPU 154) generates a "Handover Request" message, which is a control plane signal of the application layer (X2-AP layer) of the X2 interface, and then sends this to the eNB#2 through the association A established by the local node #1 operating as a client (processing 502). At that time, the eNH#1 adds the node ID of the local node #1 to the "Handover Request" message.

That is, in the present example, the application layer of the X2 interface is an example of the second layer higher than the above mentioned first layer (transport layer), and the above mentioned plane signal is an example of a signal (inter-eNB control signal) of a protocol belonging to the second layer.

In this instance, determination of the necessity or the unnecessity of the above mentioned HO can be performed with the measurement value of the reception quality of reception power or the like from the UE 30 as a reference value. Further, determination of the HO can be implemented under the initiative of the UE 30, not of the eNB 10. This point goes for in the following description.

Subsequently, the eNH#2 obtains the node ID from the above received "Handover Request" message, and confirms the opposite eNB (eNH#1 in the present example). The eNH#2 registers the node ID of the confirmed eNH#1 in the corresponding entry of the above mentioned association management table.

Further, the eNH#2 sends a "Handover Request Acknowledge" message, as a response signal (a control plane signal of the X2-AP layer) to the received "Handover Request" message, to the opposite eNH#1 through the association A which has received the "Handover Request". At that time, the eNH#2 adds the node ID of the local node to the "Handover Request Acknowledge" message, and then sends the message to the eNH#1 (processing 503).

In this instance, in a case where the node ID is added to a control plane signal of the X2-AP layer such as a "Handover Request" message and a "Handover Request Acknowledge" message, a field indicative of the node ID, for example, is provided inside the existing X2-AP layer signal. This field may be provided at an arbitrary position in the control plane signal of the X2-AP layer. Further, on the assumption that a range which can be taken by the node ID depends upon the scale of a network, this field can be of a variable length. In a case where a parameter equivalent to the node ID is present inside the control plane signal of the X2-AP layer, such a parameter can be used without addition of the node ID.

Upon reception of the "Handover Request Acknowledge" message from the opposite eNH#2, the eNH#1 obtains the node ID added to the received "Handover Request Acknowledge" message, thereby identifying the opposite eNB#2. The eNH#1 registers the obtained node ID of the eNH#2 to the corresponding entry of the above mentioned association management table.

Subsequently, when the eNH#2 determines to perform the HO from the eNH#2 to the eNH#1 in response to the movement of the UE 30 communicating with the serving eNB#2, the eNH#2 sends a "Handover Request" message, which is a control plane signal of the X2-AP layer, to the eNH#1 through the association B established by the local node #2 serving as a client (processing 504). At that time, the eNH#2 adds the node ID of the local node #2 to the "Handover Request" message.

The eNH#1 obtains the node ID from the received "Handover Request" message and confirms the opposite eNB (eNB#2, in the present example). The eNH#1 then registers the node ID of the confirmed eNH#2 in the corresponding entry of the association management table.

Further, the eNH#1 sends a "Handover Request Acknowledge" message, as a response signal (a control plane signal of the X2-AP layer) to the received "Handover Request" message, to the opposite eNH#2 through the association B, through which the "Handover Request" message has been received. At that time, the eNH#1 adds the node ID of the local node to the "Handover Request Acknowledge" message, and sends the message to the eNH#2 (processing 505).

Upon reception of the "Handover Request Acknowledge" message from the opposite eNB#1, the eNH#2 obtains the node ID added to the received "Handover Request Acknowledge" message, and identifies the opposite eNH#1. The eNH#2 registers the obtained node ID of the eNH#1 to the corresponding entry in the above association management table.

Figure 3:
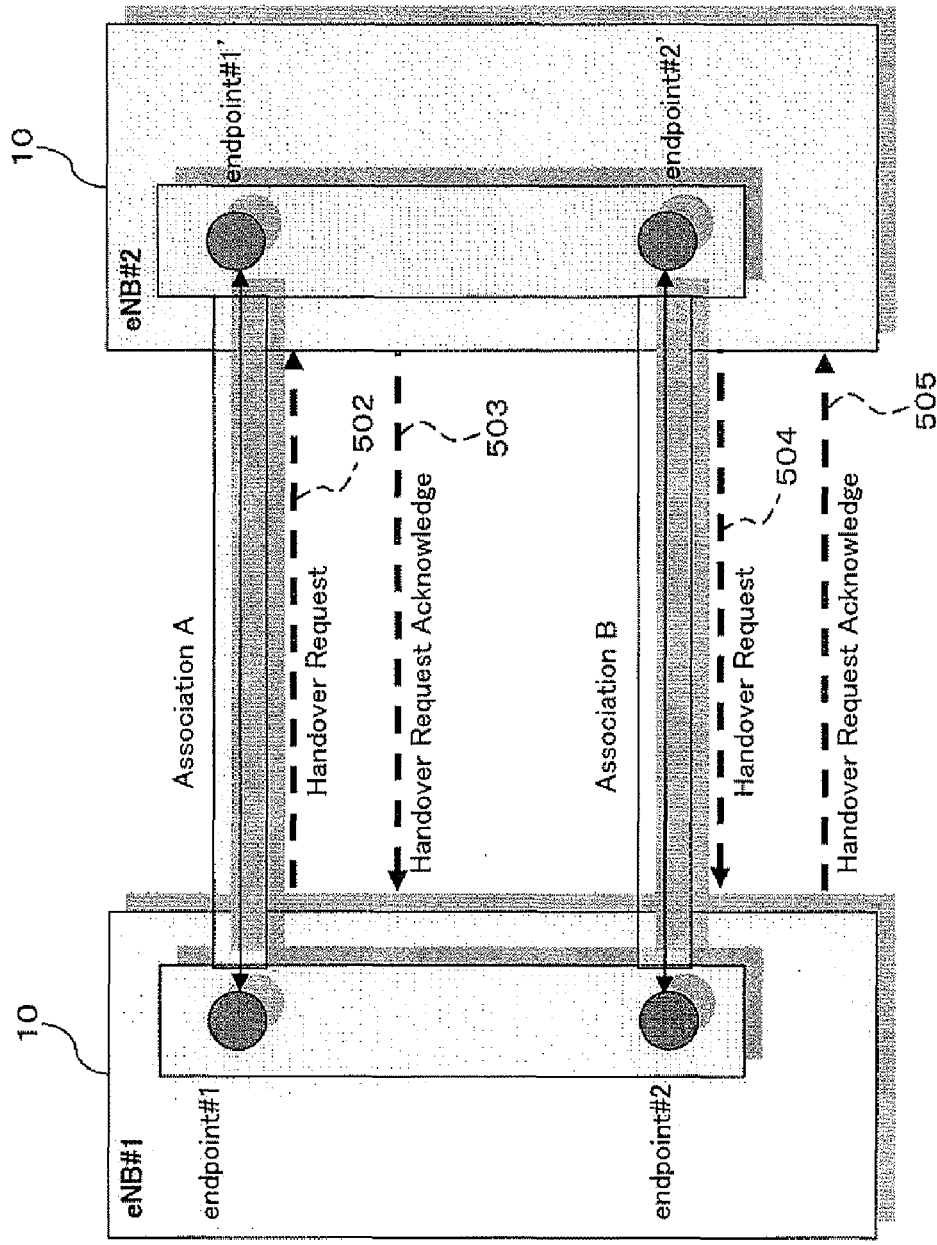
FIG. 3 is an image diagram illustrating transmission directions in which control plane signals are transmitted between eNBs in obedience to the HO sequence indicated in FIG. 2.

In this instance, FIG. 3 depicts directions in which the above "Handover Request" and "Handover Request Acknowledge" messages are transmitted in the associations A and B, respectively. Although the number of endpoints per eNB 10 is two in FIG. 3, the embodiment should by no means be limited to this. The number of endpoints may be three or larger than three for each eNB 10, and also may be different in each of the eNBs 10. Further, in the example of FIG. 3, different associations are established between different endpoints, but more than one association may be established to a single endpoint, like the point-to-multiple point. The same goes for in the following description.

Subsequently, when the eNH#1 and the eNH#2 (CPU 154) each obtain their mutual node IDs, thereby identifying their mutual opposite nodes, by means of transmitting and receiving control plane signals of the X2-AP layer (processing 601 of FIG. 5) as described above, they evaluates whether or not two or more associations A and B are established between them and their opposite eNBs (processing 602 of FIG. 5).

For example, the eNB 10 (CPU 154) checks the entries of the "opposite eNB node ID" in the association management table, thereby evaluating whether or not more than one association is established. That is, the eNB 10 recognizes the establishment of more than one association based on the fact that more than one entry is registered for one and the same "opposite eNB node ID".

When the eNB 10 (CPU 154) recognizes that more than one association is established (Yes route of processing 602 of FIG. 5), it executes a removal sequence for removing a redundant association. In the removal sequence, the eNB 10 (CPU 154) determines (a) an eNB 10 that is a removal source from which redundant association is to be removed [a transmission source of the association disconnection (removal) sequence such as a shutdown signal and an abort signal], and (b) an association to be removed between the eNH#1 and the eNH#2 (processing 603 and processing 604 of FIG. 5).

As to the above mentioned item (a), it is possible, for example, to compare the node IDs of the eNBs 10 and determine the eNB having a smaller node ID, as the number information, to be a removal source of an association. As to the above mentioned item (b), it is possible to determine the association established by the eNB 10, which is determined to be the association removal source and serves as a client, as a subject to be removed.

That is, the above described CPU 154, as an example of a releasing unit, determines the eNB to which the local eNB 10 is to perform association removal, in a case where the identifier of the local node, as number information, is smaller than the node ID (the node ID of the opposite eNB 10) received from the opposite eNB 10, and determines that the association which is established by the local eNB 10 serving as a source node is the subject to be removed (released).

Here, as an example, it is assumed that the node ID of the eNH#1 is small, as number information, as a result of comparison of the node IDs of the eNH#1 and the eNB#2, and it is also assumed that (a) the eNB 10 which is an association removal source is "eNB#1" and that (b) the association to be removed is the "association A" established by the eNH#1 as a client.

Figure 5:
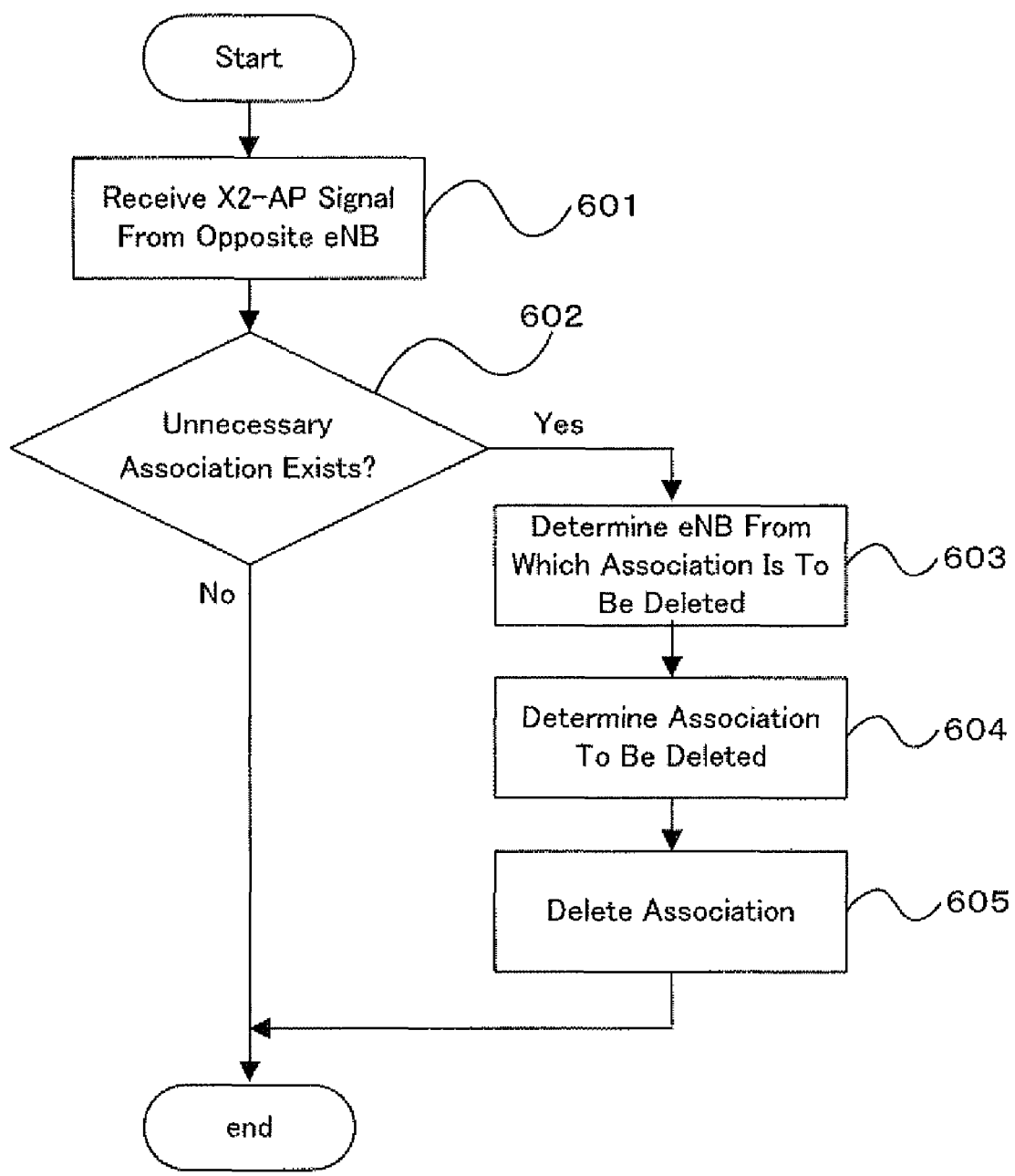
FIG. 5 is a flowchart for describing an operation of removing an association redundantly established between the eNBs in the wireless communications system illustrated in FIG. 1.

As illustrated in (1) of FIG. 4, the eNH#1 (CPU 154), which is a removal source of the association A, sends a shutdown signal (SHUTDOWN chunk) and an abort signal (ABORT chunk) to the association A determined to be removed, and implements an association disconnection (removal) sequence (processing 605 of FIG. 5).

Figure 6:
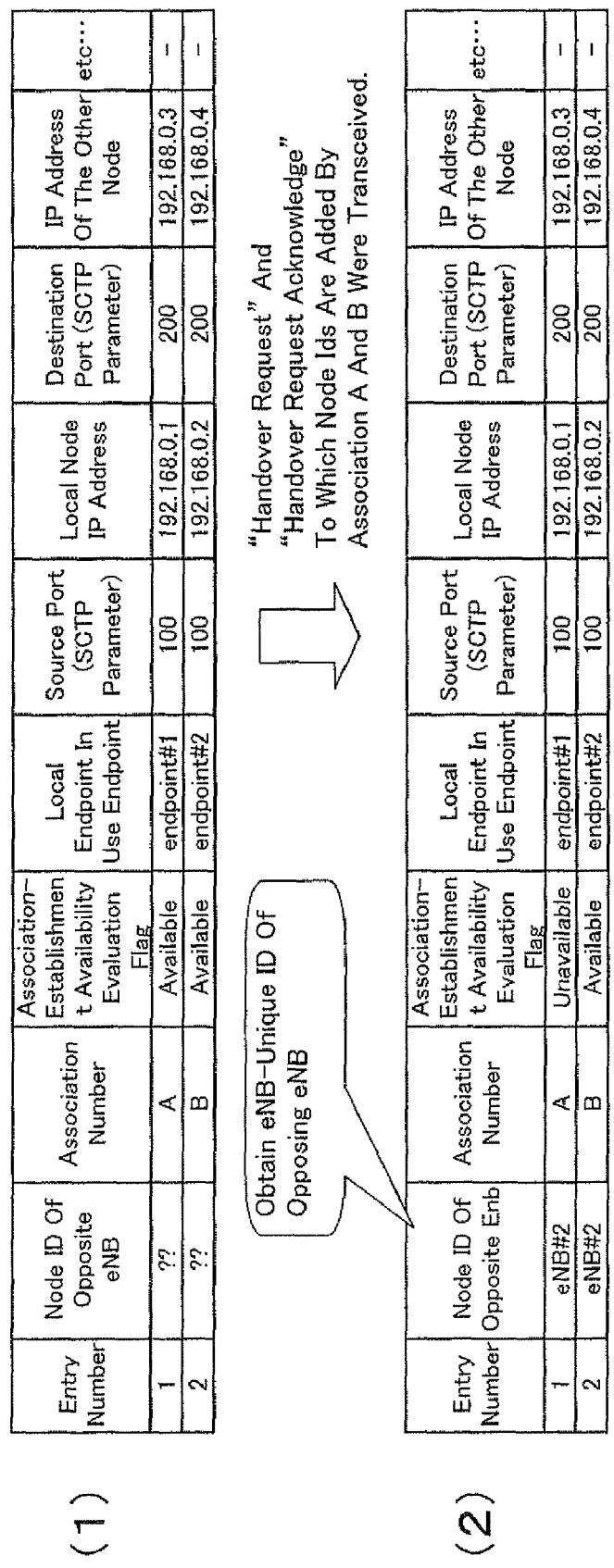
FIG. 6 is a diagram indicating an example of association management table managed by the eNB illustrated in FIG. 1.

Here, the eNH#1 and the eNH#2 each can perform, for example, setting (holding) information, such that the SCTP packet (INIT chunk) is not to be sent, in the association management table ("association establishment availability evaluation flag"), as illustrated in (2) of FIG. 6, in order to prevent the association A, which has been removed between the eNH#1 and the eNB#2, from being re-established. Here, if an SCTP packet (INIT chunk) is received due to some factor, the eNH#1 and the eNH#2 can send back a response signal (INIT ACK chunk), thereby permitting execution of an association establishment sequence.

Hereinafter, as illustrated in (2) of FIG. 4, if HO processing occurs between the eNH#1 and the eNB#2, the eNH#1 and the eNB#2 transmits and receives a control plane signal using the remaining association B.

As described above, according to the first embodiment, since anode ID is added to the control plane signal transmitted and received between the eNBs after the SCTP association is established between the eNBs 10, thereby making it possible to check (recognize) between which nodes the association is established, it is possible to determine and remove a redundant association.

Therefore, it is possible to reduce the memory amount used in the eNBs 10 and the association management processing amount, so that deterioration of the performance of the eNBs 10 can be prevented.

[C] Second Embodiment

According to the above described first embodiment, the description is made of processing of recognition of redundant associations and the removal of one of them, taking HO performed between the eNBs 10 as an example. However, the processing described in the first embodiment can also be applicable to the networks in which nodes that establish a client-server relationship therebetween such as nodes implemented with the SCTP and nodes implemented with the IPSec (Security Architecture for Internet Protocol) in the next generation wireless communications networks.

Here, the IPSec is one of the protocols in the network layers, and is a protocol that realizes manipulation prevention by data completeness assurance and data encryption using an encryption function for the protocol (IP or the like) of the network layer.

Figure 7:
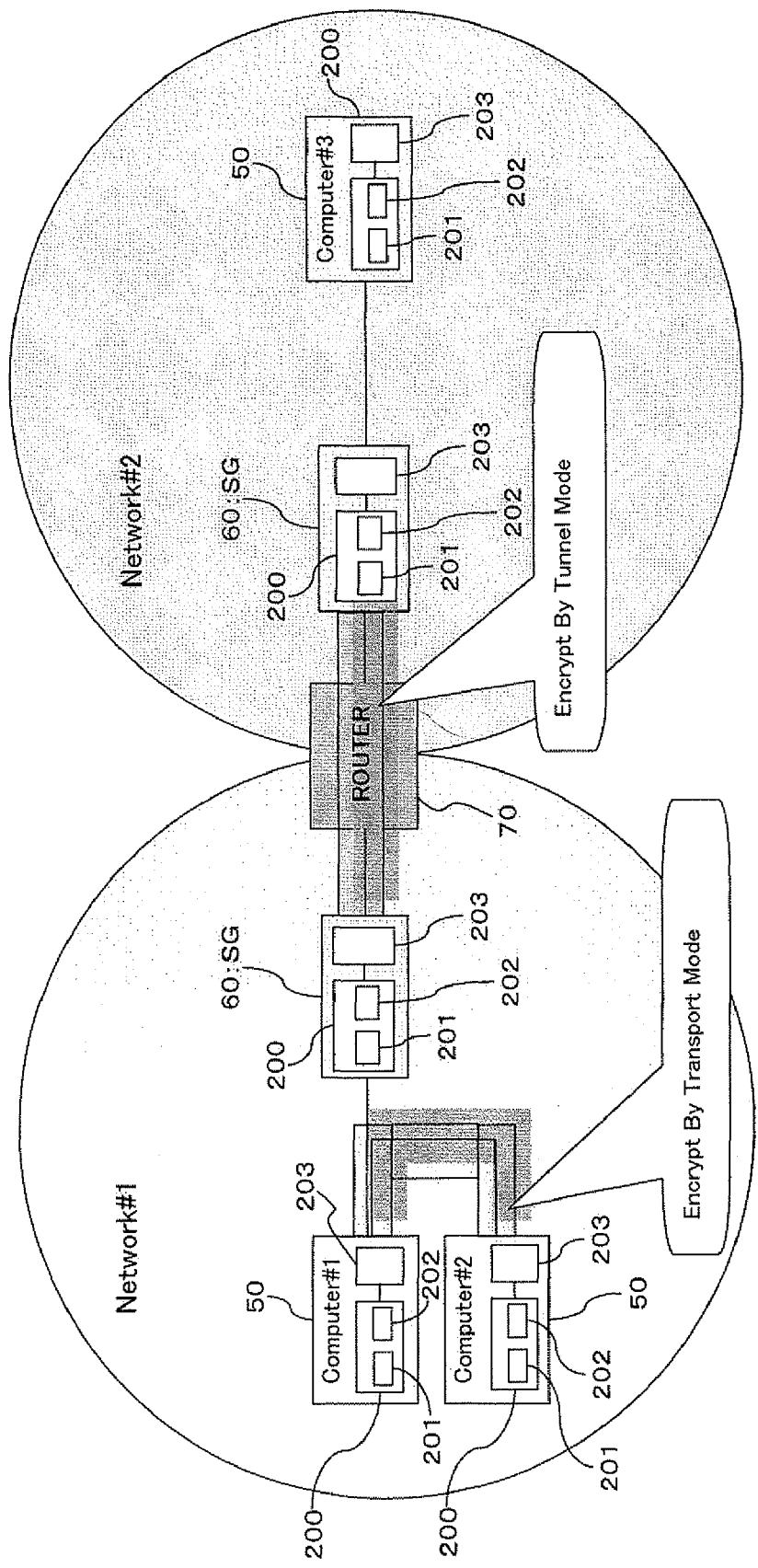
FIG. 7 is a diagram illustrating an example of a communication system according to a second embodiment.

The IPSec has two modes: a transport mode and a tunnel mode. The transport mode is a mode applied at the time two nodes are connected therebetween with the IPSec; the tunnel mode is a mode applied at the time two segments (gateways) are connected therebetween. The tunnel mode may be mainly used at the time a virtual network such as VPN (Virtual Private Network) is established. FIG. 7 depicts an image of a communications system to which the transport mode and the tunnel mode are applied.

In the example of this FIG. 7, there exist computers (user terminals) 50 (#1 and #2), as examples of nodes, and a security gateway (SG) 60 in a certain network #1, and there also exist a computer (user terminal) 50 (#3), as an example of a node, and a security gateway (SG) 60 in another network #2. The networks #1 and #2 (SG 60) are connected through the router 70.

That is, in this example, the computer #1 is capable of being connected with another computer #2 in the network #1 to which the computer #1 belongs in the IPSec transport mode. Further, the computer #1 is capable of communicating with the computer #3 belonging to another network #2 by the IPSec through a connection between the security gateways 60 in the IPSec tunnel mode.

In this instance, in FIG. 7, the reference character 201 indicates an IPSec function unit which enables communications by the IPSec; the reference character 202 indicates an application unit which copes with the protocol belonging to the application layer higher than the network layer which the IPSec belongs to; the reference character 203 indicates a memory (storage unit) holding various kinds of data used at the time the nodes 50 and 60 operate. The IPSec function unit 201 and the application unit 202 may be realized by, for example, an arithmetic calculation apparatus such as a CPU (Central Processing Unit) that functions as a communications controlling unit 200.

One of the differences between the transport mode and the tunnel mode is the following: the IP header to be added to the data to which the IPSec has been applied is an original IP header that has been added to the data before the IPSec is applied thereto (transport mode); a tunnel IP header for the tunnel mode is newly added, taking the original IP header having been added to the data before the IPSec is applied thereto as a part of the data (payload) (tunnel mode).

The functions used in this IPSec are indicated in the following table 1.

TABLE 1

| IPSec Functions | |
|---|---|
| Name of Function | Description |
| IKE (Internet Key Exchange Protocol) | Function of negotiating encryption key and security information between IPSec host and security gateway |
| AH (Authentication Header) | Function of assuring completeness of data |
| ESP (Encapsulated Security Payload) | Function of encrypting data in opposition to wire tapping and manipulation |
| IP Comp (IP Payload Compression Protocol) | Function of improving communications efficiency by data compression |

In this instance, in a case of using the IPSec, it is not necessary to use all the above listed functions, and it is possible to use some of the functions in combination.

The IPSec has a concept called Security Association (SA). In the SA, there exist a database called a Security Policy Database (SPD) for evaluating whether or not IPSec communications between the opposite nodes (IP addresses) are available and a database called an SAD (Security Association Database) holding security information (encryption algorithm, key information, communications protocol information or the like). In this instance, the SPD and the SAD are held, for example, in the above mentioned memory 203.

A description will be made hereinbelow of the SA.

1. The IPSec function unit 201 that has received data from the application unit 202 searches the SPD to evaluate whether or not IPSec communications is available with the opposite node.
2. If the IPSec communications is unavailable as a result of the searching in the SPD, the IPSec function unit 201 transmits the data received from the application to the opposite node without application of the IPSec.
3. When the IPSec communications are available as a result of the SPD, the IPSec function unit 201 searches the SAD to obtain security information for use in communications with the opposite node. If no security information exists, the IPSec function unit 201 obtains security information to be used in communications with the opposite node by the IKE protocol and then registers the obtained security information to the SAD. Then, the IPSec function unit 201 performs IPSec communications with the opposite node based on the security information registered in the SAD.
4. The IPSec function unit 201 of the opposite node that has received the data, searches the SAD and performs IPSec decrypting processing based on the security information of the data.
5. The IPSec function unit 201 of the opposite node searches the SPD for evaluating whether or not processing of data to which the IPSec decrypting processing has been performed is available. If the processing is available, the IPSec function unit 201 makes a decision of a received packet and performs the processing; if the processing is unavailable, the received packet is threw away.

Subsequently, a description will be made of the above mentioned IKE protocol.

Figure 8:
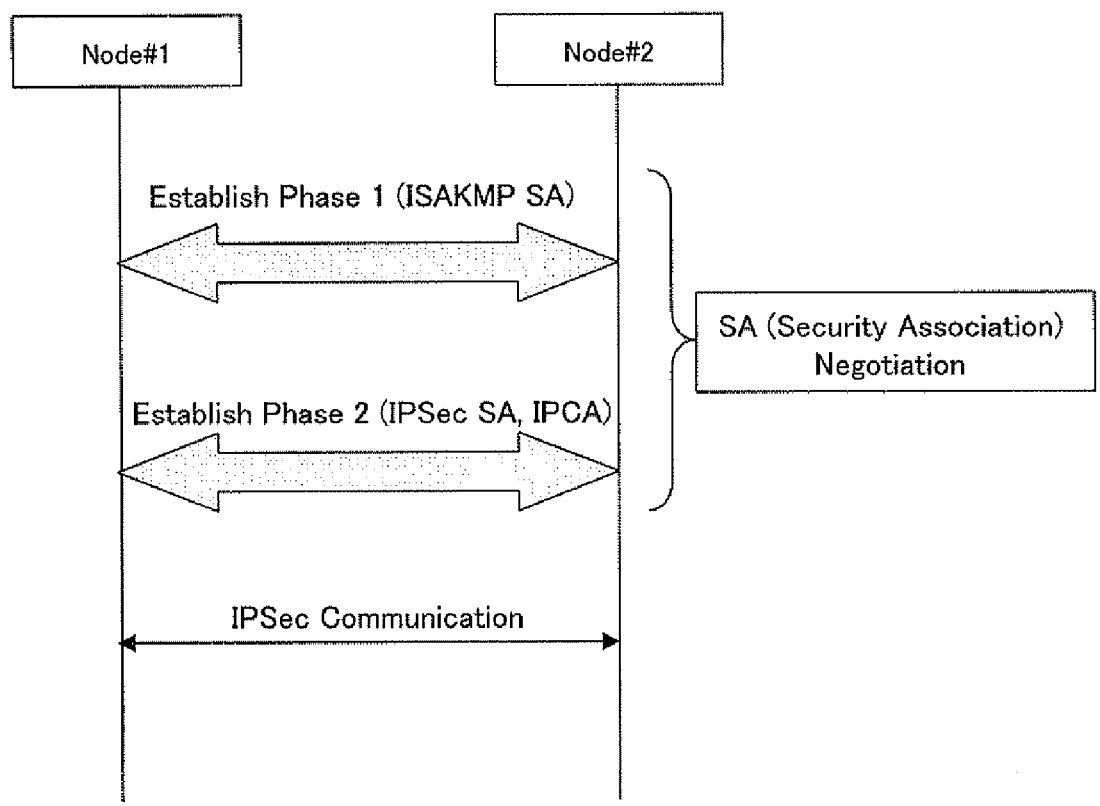
FIG. 8 is a diagram illustrating a sequence example for establishing an SA between nodes in the wireless communications system illustrated in FIG. 7.

In a case where communications are performed between the nodes by the IPSec, an SA is established between the nodes by the Ike protocol. FIG. 8 depicts an SA establishment image by the IKE protocol.

The node #1 (IPSec function unit 201) establishes an ISAKMP SA with the opposite node #2 in phase 1. The ISAKMP (Internet Security Association and Key Management Protocol) is a protocol for use in performing authentication of the opposite node with which key exchange is to be performed and in key exchange. At that time, the SA is established bi-directionally and used to assure an IKE message itself.

Subsequently, the node #1 (IPSec function unit 201) establishes an IPSec SA and an IPCA (IPComp Association) with the opposite node #2 in phase 2. The IPSec SA is established for determining an algorithm, such as AH and ESP, for use in actual data communications. The IPCA is an SA to be established for performing IPComp (data compression).

These SAs are unidirectional, and a total of six SAs are necessary for establishing the AH, ESP, and IPCA in both of the nodes #1 and #2. In this case, since each of the nodes #1 and #2 (IPSec function unit 201) mutually serves as sources (clients) of IPSec establishment, there is a possibility that more than one IPSec association (SA) is established between the nodes in the similar manner to the SCTP described in the first embodiment. In this instance, the above described "inter-node" can contain any one or more than one of the following: between the nodes 50; between the node 50 and the node 60; and between the nodes 60, as exemplified in FIG. 7.

As to such more than one SA, in the communications controlling units 200 provided for the node #1 and the node #2, the processing similar to that of the first embodiment is available. That is, the communications controlling unit 200 has functions as a management means (the identifying and releasing units of SA) relating to the SA and as a node ID adding means.

Then, the communications controlling unit 200 performs processing such as SA establishment with and release from another node, addition of the ID of the local node to the signal (control plane signal) transmitted and received by the (second) protocol belonging to the second layer (application layer) higher than the first layer (network layer) to which the IPSec (the first protocol) belongs, association of the SA with the node ID received by a control plane signal from the opposite node, and identification and removal (release) of a redundant SA.

A description of an example of the above will be made hereinbelow.

Figure 9:
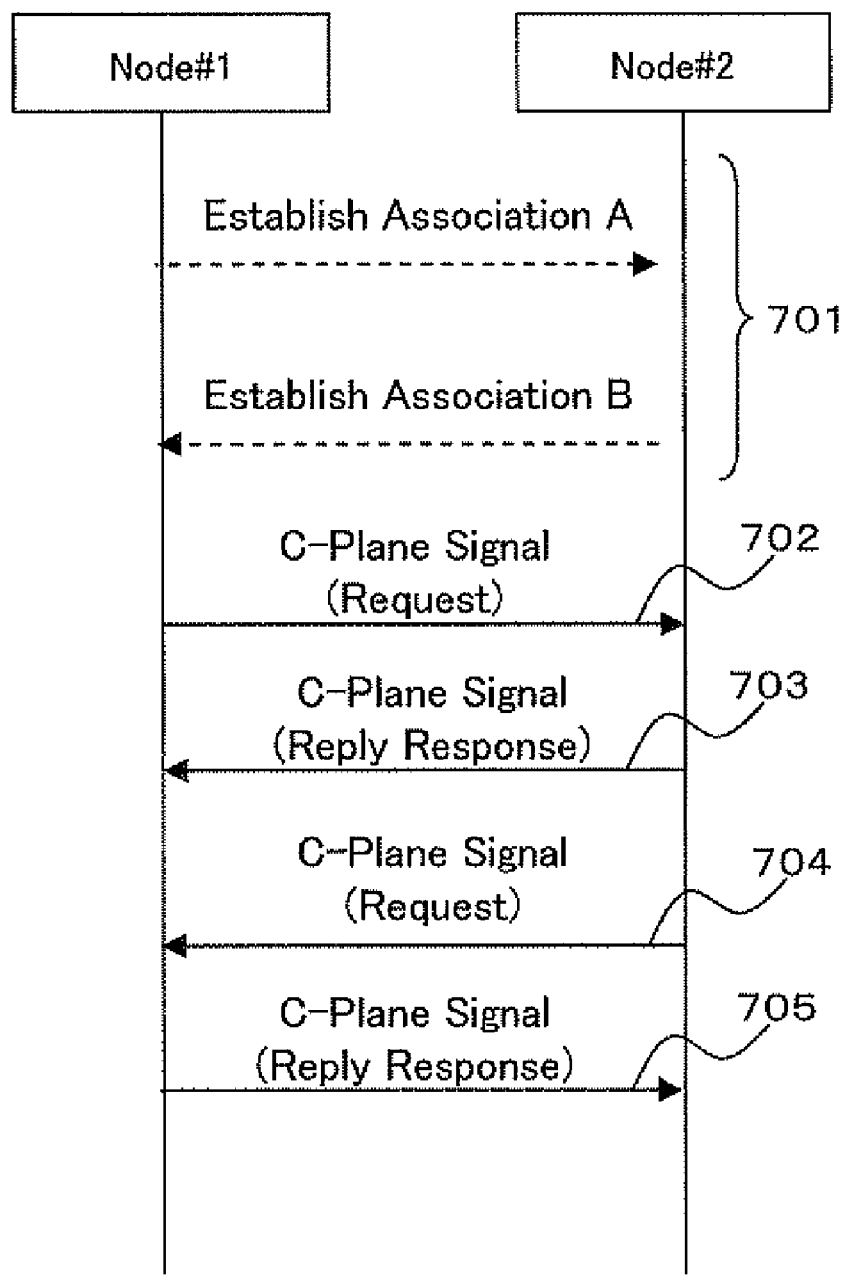
FIG. 9 is a diagram illustrating an example of a signal sequence using the SA established between the nodes depicted in FIG. 7.

As illustrated in FIG. 9, for example, it is assumed that the node #1 and the node #2 each mutually execute an association establishment operation, and two or more associations A and B are established between the node #1 and the node #2 (processing 701).

In this case, the node #1 manaes the association A which is established with the opposite node #2 by the node #1 operating as a client itself, and also the association B which is established by the node #1 (its opposite node is unrecognized) that operates as a server itself.

Likewise, the node #2 manages each of the association B established with the opposite node #1 which is established by the node #2 operating as a client itself and the association A (the opposite node is unrecognized) which is established by the node #2 operating as a server itself. The management methods in the node #1 and the node #2 can be the ones similar to those in the first embodiment.

Subsequently, a case is considered where communications is performed between the node #1 and the node #2 by a certain application (a protocol of the application layer higher than the network layer belonging to the IPSec).

For example, when the node #1 sends any request to the opposite node #2 by a certain application, the node #1 sends an inter-node control plane signal (Request) of the application layer indicating as such to the opposite node #2 through the association A established by the local node #1 serving as a client (processing 702). At that time, the node #1 adds the node ID of the local node #1 to the control plane signal (Request).

The node #2 obtains the above mentioned node ID from the received control plane signal (Request), thereby confirming the opposite node #1. The node #2 registers the node ID of the confirmed opposite node #1 to the corresponding entry in the association management table (for example, held in the memory 203).

Further, the node #2 sends a response signal [control plane signal (Reply)] to the received control plane signal (Request) to the opposite node #1 through the association A that has received the control plane signal (Request). At that time, the node #2 adds the node ID of the local node to the control plane signal (Reply) (processing 703).

In this instance, when a node ID is added to the control plane signal (Request and/or Reply), a field indicative of the node ID is provided, for example, in the existing control plane. This field may be provided at an arbitrary position in the control plane signal. Further, this field may be of a variable length on the assumption that a range which can be taken by the node ID depends upon the scale of a network. In a case where a parameter equivalent to the node ID is present in the control plane signal, it is possible to use that parameter to indicate the node ID without addition of another node ID.

When receiving the control plane signal (Reply) from the node #2, the node #1 obtains the node ID added to the received control plane signal (Reply), thereby identifying the opposite node #2. The node #1 registers the node ID of the obtained node #2 to the corresponding entry in the association management table (for example, held in the memory 203).

Subsequently, when sending any request to the opposite node #1, the eNH#2 sends an inter-node control plane signal (Request) indicating as such to the opposite node #1 through the association B established by the local node #2 serving as a client (processing 704). At that time, the node #2 adds the node ID of the local node #2 to the control plane signal (Request).

The node #1 obtains the node ID from the received control plane signal (Request), thereby confirming the opposite node #2. The node #1 then registers the ID of the confirmed node #2 to the corresponding entry in the association management table.

Further, the node #1 sends a control plane signal (Reply), as a response signal to the received control plane signal (Request), to the opposite node #2 through the association B that has received the control plane signal (Request). At that time, the node #1 adds the node ID of the local node #1 to the control plane signal (Reply), and sends the signal to the node #2 (processing 705).

When receiving the control plane signal (Reply) from the node #1, the node #2 obtains the node ID added to the received control plane signal (Reply), thereby identifying the opposite node #1. The node #2 registers the obtained node ID of the node #1 to the corresponding entry in the association management table.

Figure 10:
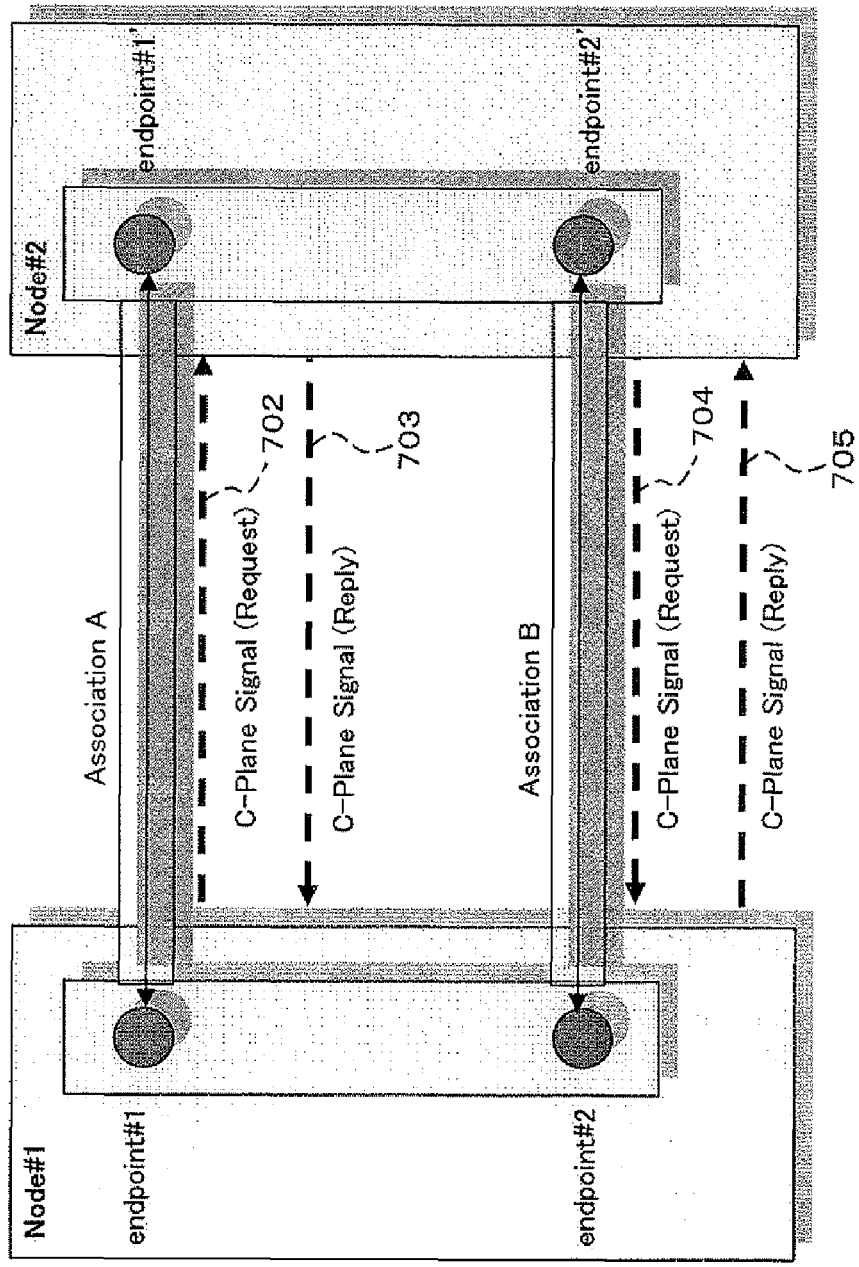
FIG. 10 is an image diagram illustrating directions in which control plane signals are transmitted between nodes in obedience to the signal sequence illustrated in FIG. 9.

In this instance, FIG. 10 depicts directions in which the above described control plane signals (Request and Reply) are transmitted in the associations A and B.

Subsequently, when the node #1 and the node #2 each recognize their opposite nodes by means of obtaining their mutual node IDs by transceiving the control plane signals (processing 801 of FIG. 12) as described above, the node #1 and the node #2 each evaluate whether or not two or more associations A and B are established between the opposite nodes (processing 802 of FIG. 12).

For example, the node #1 and the node #2 check the entries of the "opposite node IDs" in the association management table, thereby evaluating whether or not more than one association is established. That is, the node #1 and the node #2 recognize the fact that more than one association is established depending upon the fact that more than one entry for one and the same "opposite node ID" is registered.

When the node #1 and the node #2 recognize that more than one association is established (Yes route of processing 802 of FIG. 12), they implement a removal sequence of the a redundant association. In the removal sequence, the node #1 and the node #2 determines (a) the node that serves as an association removal source [the transmission source of an association disconnection (removal) sequence such as a shutdown signal or a transmission abort signal] and (b) an association to be removed between the node #1 and the node #2 (processing 803 and processing 804 of FIG. 12).

As to the above described item (a), for example, the node IDs are compared, thereby determining the node having a smaller node ID, as number information, to be an association removal source. As to the above described item (b), the association established by the node, which serves as the association removal source and operates as a client, can be determined as a subject to be removed.

Here, as a result of comparison of the node IDs of the node #1 and the node #2, it is assumed that the node ID of the node #1 is small, as number information, and it is assumed that (a) the node which serves as an association removal source is determined to be the "node #1" and that (b) the association to be removed is determined to be the "association A" which is established by the node #1 serving as a client.

Figure 12:
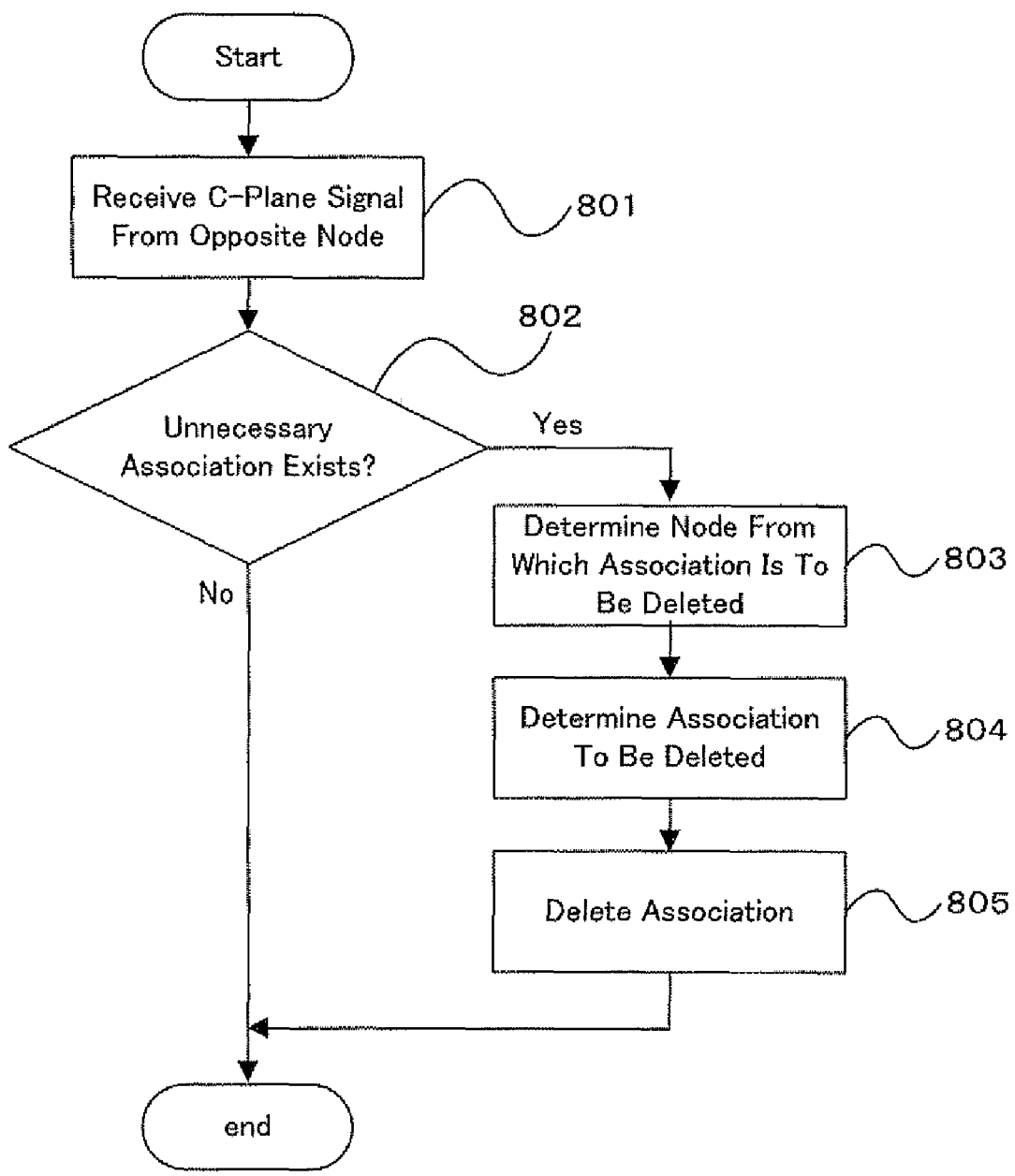
FIG. 12 is a flowchart for describing an operation of removing an association redundantly established between the nodes in the wireless communications system illustrated in FIG. 7.

As illustrated in (1) of FIG. 11, the node #1, which is the removal source of the association A, sends a shutdown signal and an abort signal to the association A that has been determined to be removed, and performs an association disconnection (removal) sequence (processing 805 of FIG. 12).

Here, the node #1 and the node #2 each hold information (establishment-unavailability), such that an IPSec establishment control packet is not to be sent in the association management table ("association establishment availability evaluation flag"), in order to prevent re-establishment of the association A, which has been removed between the node #1 and the node #2. Here, if a control plane signal is received due to some factor, a response signal (Reply) can be sent back, the association establishment sequence being thereby permitted to be performed.

Subsequently, as illustrated in (2) of FIG. 11, when a control plane signal is transmitted and received between the node #1 and the node #2, they use the remaining association B to transmit and receive a control plane signal therethrough.

As described above, in the second embodiment, as to the IPSec associations, also, after more than one association is established between certain nodes, a node ID is added to a control plane signal transmitted and received between the nodes, so that it is possible to check (identify) between which nodes the associations are established, and thus, a redundant association is capable of being determined and removed.

Accordingly, it is possible to reduce the memory amount used by a node provided with an IPSec communications function and to reduce the association management processing amount, so that deterioration of the performance of the nodes provided with an IPSec communications function is prevented.

[D] Other Modification(s)

In this instance, according to the above described first embodiment, the SCTP belonging to the transport layer is mentioned as an example of the first protocol belonging to the first layer used for establishing associations between the eNBs, and an inter-eNB control plane signal belonging to the application layer is mentioned as an example of a signal of the second protocol belonging to the higher (second) layer which transmits the associations. However, the present invention should by no means be limited to this.

Likewise, according to the second embodiment, the IPSec belonging to the network layer is mentioned as an example of the first protocol belonging to the first layer used for establishing a security association (SA) between the nodes, and an inter-node control plane signal belonging to the application layer is mentioned as an example of a signal of the second protocol belonging to the higher (second) layer through which the above mentioned SA is transmitted. However, the present invention should by no means be limited to this.

The above described embodiment is applicable to these layer and protocol communications being subordinate to these layer and protocol.

All examples and conditional language recited herein are intended for pedagogical purposes to aid the reader in understanding the invention(s) and the concepts contributed by the inventor(s) to furthering the art, and are to be construed as being without limitation to such specifically recited examples and conditions, nor does the organization of such examples in the specification relate to a showing of the superiority and inferiority of the invention. Although the embodiment(s) has been described in detail, it should be understood that the various changes, substitutions, and alterations could be made hereto without departing from the spirit and scope of the invention(s).

What is claimed is:

1. A communication system including a first node and a second node configured to communicate with the first node, the system comprising:
a first unit that transmits a signal of a second protocol belonging to a second layer, the signal including a source node identifier, to a first logical communication link established between the first node and the second node by using a first protocol belonging to a first layer, the second layer being higher than the first layer; and
a second unit that manages the first logical communication link in association with the source node identifier added to the signal received through the first logical communication link,
wherein the second unit comprises:
an identifying unit to identify, based on the source node identifier associated with the first logical communication link, a second logical communication link that is associated with the source node identifier and has been established between the first node and the second node before the node identifier added to the signal is managed in association with the first logical communication link; and
a releasing unit to release either one of the first and second logical communication links.

2. A method of communication processing in a communication system including a first node and a second node configured to communicate with the first node, the method comprising:
transmitting a signal of a second protocol belonging to a second layer, the signal including a source node identifier, to a first logical communication link established between the first node and the second node by using a first protocol belonging to a first layer, the second layer being higher than the first layer; and
managing the first logical communication link in association with the source node identifier added to the signal received through the first logical communication link, wherein the managing includes identifying, based on the source node identifier associated with the first logical communication link, a second logical communication link that is associated with the source node identifier and has been established between the first node and the second node and releasing either one of the first and second logical communication links.

3. The method of claim 2, wherein the node executing the releasing is a node having the source node identifier, as number information, smaller than that of the other node.

4. The method of claim 3, wherein the one of the first and second logical communication links to be subjected to the releasing is established by a node serving as a source node and having the number information, as the source node identifier, smaller than that of the other node.

5. The method of claim 2,
wherein the first node and the second node each are radio base stations,
wherein the first protocol is a Stream Control Transmission Protocol (SCTP) belonging to a transport layer as the first layer, and
wherein the signal of the second protocol is an inter-base station control signal belonging to an application layer as the second layer.

6. The method of claim 5, wherein the inter-base station control signal is a control signal relating to handover processing.

7. The method of claim 2,
wherein the first node and the second node each have a communication function used for a security architecture for Internet protocol (IPSec) that belongs to a network layer as the first layer, and
wherein the signal of the second protocol is an inter-node control signal belonging to an application layer as the second layer.

8. A second node configured to communicate with a first node, the second node comprising:
a reception unit configured to receive a signal of a second protocol belonging to a second layer, the signal including a node identifier of the first node, from a first logical communication link established between the nodes by using a first protocol belonging to a first layer, the second layer being higher than the first layer; and
a management unit configured to manage the first logical communication link in association with the node identifier added to the signal received by the reception unit, wherein the management unit comprises:
an identifying unit to identify, based on the node identifier associated with the first logical communication link, a second logical communication link that is associated with the source node identifier and has been established between the first node and the second node before the node identifier added to the signal is managed in association with the first logical communication link; and
a releasing unit to release either one of the first and second logical communication links.

9. The node of claim 8, further comprising:
a transmitting unit configured to transmit a signal of the second protocol, which signal includes a node identifier of the second node added thereto, to the first logical communication link.

10. The node of claim 9, wherein the releasing unit executes the releasing, when the node identifier, as number information, of the second node is smaller than that of the node identifier received from the first node.

11. The node of claim 10, wherein the releasing unit releases the one of first and second logical communication links which is established by the second node serving as a source node.

12. The node of claim 8,
wherein the first node and the second node each are radio base stations,
wherein the first protocol is a Stream Control Transmission Protocol (SCTP) belonging to a transport layer as the first layer, and
wherein the signal of the second protocol is an inter-base station control signal belonging to an application layer as the second layer.

13. The node of claim 12, wherein the inter-base station control signal is a control signal relating to handover processing.

14. The node of claim 8,
wherein the first node and the second node each are nodes having a communication function used for a security architecture for Internet protocol (IPSec) as the first protocol belonging to a network layer as the first layer, and
wherein the signal of the second protocol is a inter-node control signal belonging to an application layer as the second layer.

15. A first node configured to communicate with a second node, the first node comprising:
a node identifier adding unit configured to add a node identifier of the first node to a signal to be transmitted to a first logical communication link established between the nodes by using a first protocol belonging to a first layer, which signal is a signal of a second protocol belonging to a second layer higher than the first layer; and
a transmitting unit to transmit the signal of the second protocol, the signal including the node identifier, to the first logical communication link for recognition, based on the node identifier associated with the first logical communication link, of a second logical communication link that is associated with the source node identifier and has been established between the first node and the second node before the node identifier added to the signal is managed in association with the first logical communication link and release of either one of the first and second logical communication links in the second node.

* * * * *